US010559957B2

United States Patent
Pedersen et al.

(10) Patent No.: US 10,559,957 B2
(45) Date of Patent: Feb. 11, 2020

(54) MICROGRID ELECTRIC POWER GENERATION SYSTEMS AND ASSOCIATED METHODS

(71) Applicant: MAERSK DRILLING A/S, Kgs. Lyngby (DK)

(72) Inventors: John Røn Pedersen, Frederikssund (DK); Martin Speiermann, Brønshøj (DK)

(73) Assignee: MAERSK DRILLING A/S., Kgs. Lyngby (DK)

( * ) Notice: Subject to any disclaimer, the term of this patent is extended or adjusted under 35 U.S.C. 154(b) by 50 days.

(21) Appl. No.: 16/060,144

(22) PCT Filed: Dec. 7, 2016

(86) PCT No.: PCT/DK2016/000047
§ 371 (c)(1),
(2) Date: Nov. 13, 2018

(87) PCT Pub. No.: WO2017/097305
PCT Pub. Date: Jun. 15, 2017

(65) Prior Publication Data
US 2018/0366950 A1 Dec. 20, 2018

Related U.S. Application Data

(63) Continuation-in-part of application No. PCT/DK2016/000006, filed on Feb. 22, 2016.

(30) Foreign Application Priority Data

Dec. 7, 2015 (DK) .................................. 2015 00789

(51) Int. Cl.
*H02J 3/30* (2006.01)
*H02J 3/46* (2006.01)
(Continued)

(52) U.S. Cl.
CPC ................ *H02J 3/30* (2013.01); *F02D 19/06* (2013.01); *H02J 3/381* (2013.01); *H02J 3/46* (2013.01)

(58) Field of Classification Search
USPC ......................................................... 318/149
See application file for complete search history.

(56) References Cited

U.S. PATENT DOCUMENTS 9,755,458 B2 * 9/2017 Frampton ................. H02J 3/48
2003/0222460 A1 * 12/2003 Chiang ..................... F02N 5/02
290/41
(Continued)

FOREIGN PATENT DOCUMENTS

WO WO 2015/133029 9/2015

OTHER PUBLICATIONS

International Patent Application No. PCT/DK2016/000047 ; International Search Report and Written Opinion dated Mar. 27, 2017 (13 pages).

(Continued)

*Primary Examiner* — Bentsu Ro
(74) *Attorney, Agent, or Firm* — Lathrop Gage LLP

(57) ABSTRACT

A method for operating a microgrid electric power generation system includes delivering energy to an electric power bus at least partially from one or more kinetic generators electrically coupled to the electric power bus, controlling the one or more kinetic generators in response to a change in a load such that a magnitude of a voltage on the electric power bus remains within a predetermined voltage range, and controlling one or more combustion generators electrically coupled to the electric power bus based at least in part on an operating state of the one or more kinetic generators. The one or more kinetic generators are capable of (a) delivering (Continued)

energy stored therein to the electric power bus, and (b) storing energy in kinetic form.

29 Claims, 13 Drawing Sheets

(51) Int. Cl.
    *H02J 3/38*     (2006.01)
    *F02D 19/06*     (2006.01)

(56) References Cited

U.S. PATENT DOCUMENTS

| | | | |
|---|---|---|---|
| 2010/0133816 A1* | 6/2010 | Abolhassani | H02K 3/28 290/44 |
| 2012/0187922 A1* | 7/2012 | Dubois | F16F 15/305 322/4 |
| 2012/0292992 A1 | 11/2012 | Williams | |
| 2013/0270902 A1 | 10/2013 | Andersen et al. | |
| 2015/0097432 A1* | 4/2015 | Gurin | H02P 9/008 307/31 |

OTHER PUBLICATIONS

Ankit Verma: "Alternate Power and Energy Storage/Reuse for Drilling Rigs: Reduced Cost and Lower Emissions Provide Lower Footprint for Drilling Operations" Jul. 14, 2010 (Jul. 14, 2010).
Frederik Frederik Smidth: "Maersk Drilling—Innovation and Energy Storage," Sep. 28, 2015 (Sep. 28, 2015).

* cited by examiner

MICROGRID ELECTRIC POWER GENERATION SYSTEMS AND ASSOCIATED METHODS

CROSS REFERENCE TO RELATED APPLICATIONS

The present application is a 35 U.S.C. § 371 filing of International Application No. PCT/DK2016/000047, filed 7 Dec. 2016, which claims priority to Danish Patent Application No. PA 2015 00789 filed 7 Dec. 2015 and International Patent Application No. PCT/DK2016/000006 filed 22 Feb. 2016, the entire contents of which are incorporated herein by reference.

BACKGROUND

An offshore drilling rig (also referred to as mobile offshore drilling unit (MODU)) typically includes a self-contained electric power system, often referred to as a "microgrid," to power a variety of electric loads on the drilling rig. Examples of such loads include drawworks, winches, hydraulic power units (HPUs), electric thrusters, mud pumps, top drives, rotary tables, dynamic braking systems, cement pumps, cranes and peripheral electrical loads. Some of these electric loads are relatively constant. For example, lighting, HVAC (heating, ventilation and air conditioning), pumps, agitators, mixers, and air compressors commonly present a base load of approximately one to five megawatts (MW). Mud pumps, top drives, and rotary tables may also present a relatively constant electric load.

On the other hand, some significant electric loads on an offshore drilling rig may be very dynamic. For instance, drawworks, winches, thrusters, cranes and HPUs present highly variable loads with peak power demands that are, for example, two to three times larger than typical base loads. As one particular example, some drawworks have a load requirement that can vary by up to ten MW in less than twenty seconds and that can ramp up from zero to about seven MW in less than two seconds. As another example, each thruster on a drilling rig may represent a maximum load of around five MW, and a typical drilling rig may have six to eight thrusters, resulting in a total thruster maximum load of over thirty MW. Each thruster may ramp up to its maximum load in approximately ten to twenty seconds, and multiple thrusters may be activated at once. Thrusters may therefore present a very large transient load on a drilling rig. Consequentially, an offshore drilling rig's microgrid must support significant transient, as well as steady-state, electric loads. Additionally, an offshore drilling rig's microgrid must be highly reliable since an electric power failure or "blackout" may have catastrophic consequences, including loss of life, significant environmental damage, and large economic loss.

AC combustion generators or "gensets" are commonly used to provide electric power in a microgrid. These generators require significant time to start-up, and these generators cannot quickly respond to load changes due to their large inertia. Consequently, these generators are conventionally operated with large "spinning reserve," i.e., spare generating capacity of operating generators, to support load increases, as well as to ensure sufficient generator capacity in case of a single generator failure. Supercapacitors are typically also provided to support transient loads, especially large load decreases. Battery storage subsystems are sometimes provided to supply power for a limited time in the event of complete generator failure. Battery storage subsystems, however, respond relatively slowing to transients loads, and therefore, supercapacitors are needed to supplement a battery storage system.

SUMMARY

In an embodiment, a method for operating a microgrid electric power generation system includes (a) delivering energy to an electric power bus at least partially from one or more kinetic generators electrically coupled to the electric power bus, the one or more kinetic generators storing energy therein in kinetic form; (b) controlling the one or more kinetic generators in response to a change in a load powered by the electric power bus such that a magnitude of a voltage on the electric power bus remains within a predetermined voltage range; and (c) controlling one or more combustion generators electrically coupled to the electric power bus based at least in part on an operating state of the one or more kinetic generators.

In an embodiment, controlling the one or more combustion generators includes maintaining an output power of the one or more combustion generators at a constant value during the change in load.

In an embodiment, the method further includes maintaining the output power of the one or more combustion generators at eighty percent or more of a maximum rated output power of the one or more combustion generators during the change in load.

In an embodiment, the method further includes controlling the one or more combustion generators in response to a signal indicating an upcoming change in the load.

In an embodiment, controlling the one or more combustion generators electrically coupled to the electric power bus based at least in part on the operating state of the one or more kinetic generators includes controlling the one or more combustion generators according to one or more of (a) kinetic energy storage level of the one or more kinetic generators and (b) kinetic energy loss rate of the one or more kinetic generators.

In an embodiment, the method further includes (a) controlling the one or more kinetic generators in response to the change in the load within 10 ms of the change in load and (b) controlling the one or more combustion generators at least one second after the change in load.

In an embodiment, the step of controlling the one or more combustion generators includes initiating change in operation of the one or more combustion generators; and changing power output of the one or more combustion generators at least one second after the step of initiating.

In an embodiment, the method further includes controlling the one or more combustion generators without consideration of the voltage on the electric power bus.

In an embodiment, the method further includes providing an output power of at least 1 MW from the one or more kinetic generators to the load for at least 5 minutes.

In an embodiment, the method further includes spinning a rotor of each kinetic generator at a speed of at least 30,000 revolutions per minute.

In an embodiment, the method further includes controlling the one or more kinetic generators such that frequency of the voltage on the electric power bus remains within a predetermined frequency range.

In an embodiment, a method for operating a microgrid electric power generation system includes (a) operating one or more combustion generators electrically coupled to an electric power bus such that an output power of the one or more combustion generators is at least 60% of a maximum rated output power of the one or more combustion generators; and (b) in response to a change in a load powered by electric power bus, changing an output power of one or more kinetic generators electrically coupled to the electric power bus within 2 ms of the change in load, to compensate for the change in the load, where the one or more kinetic generators are capable of (1) delivering energy stored therein to the load, and (2) storing energy in kinetic form. In an embodiment, the method further includes providing an output power of at least 1 MW from the one or more kinetic generators to the load for at least 5 minutes. In an embodiment, the method further includes operating the one or more combustion generators within ten percent of an optimum operating point of a specific fuel consumption curve of the one or more combustion generators. The method additionally includes, in an embodiment, changing the output power of the one or more combustion generators in response to a change in operating state of the kinetic generator. In an embodiment, the method further includes providing more power to the load from the one or more kinetic generators than from any one combustion generator of the one or more combustion generators.

In an embodiment, a microgrid electric power generation system includes an electric power bus, one or more combustion power sources, and one or more kinetic energy subsystems. Each combustion power source includes (a) a combustion generator electrically coupled to the electric power bus and (b) a first control subsystem configured to control delivery of power by the combustion power source to the electric power bus, where each combustion power source has a respective first time constant representing an amount of time required for the combustion generator to a change its power output by ten percent. Each kinetic energy subsystem includes (a) kinetic generator capable of (1) delivering energy stored therein to the electric power bus, and (2) storing energy from the electric power bus in kinetic form; (b) a power converter electrically coupling the kinetic generator to the electric power bus, and (c) a second control subsystem configured to control the kinetic generator and the power converter of the kinetic energy subsystem such that magnitude of a voltage on the electric power bus remains within a predetermined voltage range. Each kinetic energy subsystem has a respective second time constant representing an amount time required for the kinetic energy subsystem to change its power storage or delivery by ten percent, and each second time constant is smaller than each first time constant.

In an embodiment, each second time constant is no more than ten percent of each first time constant.

In an embodiment, each first control subsystem is further configured to control its respective combustion generator based at least in part on an operating state of the kinetic generators of the one or more kinetic energy subsystems. The operating state of the kinetic generators of the one or more kinetic energy subsystems includes at least one of (a) kinetic energy storage level of the kinetic generators and (b) kinetic energy loss rate of the kinetic generators, in a particular embodiment.

In an embodiment, the first control subsystem is further configured to control its respective combustion generator without consideration of the voltage on the electric power bus.

In an embodiment, each second control subsystem is further configured to control its respective kinetic generator according to a load powered by the electric power bus. Each second control subsystem is yet further configured to control its respective kinetic generator according to a signal indicating an upcoming change in the load powered by the electric power bus, in a particular embodiment.

In an embodiment, each second control subsystem is further configured to control its respective kinetic generator such that frequency of the voltage on the electric power bus remains within a predetermined frequency range.

In an embodiment, each kinetic generator has an energy storage capacity of at least 100 kWh and a response time of no more than 2 milliseconds. In a particular embodiment, the kinetic generators of the one or more kinetic energy subsystems collectively have a maximum power output of at least 4 MW.

In an embodiment, the kinetic generators of the one or more kinetic energy subsystems collectively have a maximum power output that is at least as large as a maximum power output of any one combustion generator of the one or more combustion power sources.

In an embodiment, the electric power bus is one or more of a direct current (DC) electric power bus and an alternating current (AC) electric power bus.

In an embodiment, each kinetic generator has horizontal extent of less than 2 meters.

In an embodiment, a rotor of each kinetic generator is capable of rotating at a speed of at least 30,000 revolutions per minute.

DETAILED DESCRIPTION OF THE EMBODIMENTS

Applicant has developed microgrid electric power generation systems and associated methods which significantly advance the state of the art. These electric power generation systems include one or more kinetic generators which enable the systems to support transient loads without large generator spinning reserve, thereby promoting efficient operation and small system size. Additionally, the kinetic generators can power a large load for a significant time in the event of generator failure, thereby reducing, or even eliminating, the need for a battery storage subsystem to provide backup power. Reduction or elimination of a battery storage subsystem may achieve significant system cost and size savings, as well as improve system reliability and reduce system maintenance requirements. Furthermore, the fast response of the kinetic generators enables certain embodiments of the present systems to support transient loads without supercapacitors, thereby further promoting low system cost, small system size, and high system reliability. Moreover, certain embodiments of the featured systems are capable of storing power from regenerative braking for later use, thereby promoting efficiency and resistance to reverse power tripping.

Figure 1:
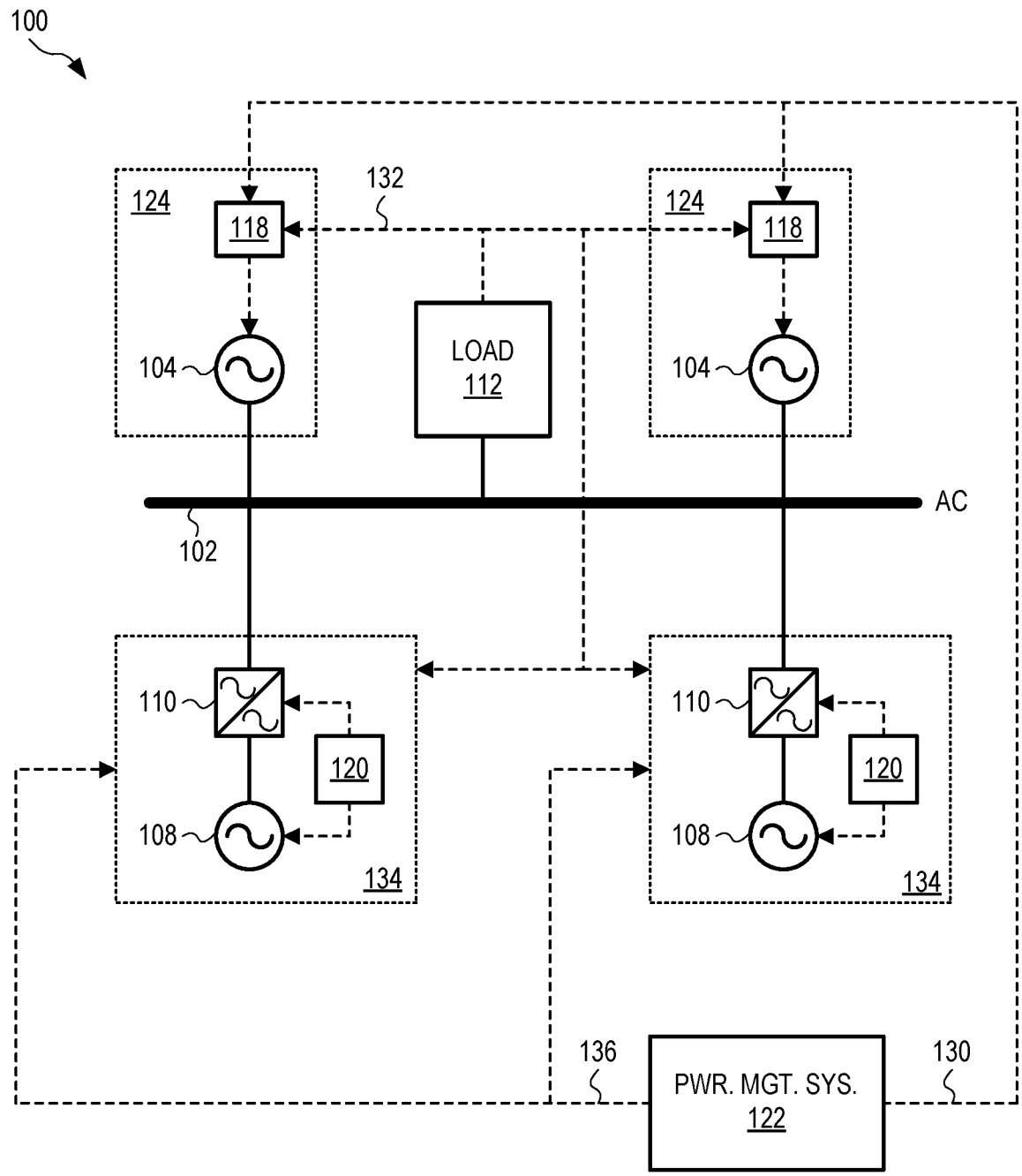
FIG. 1 illustrates one microgrid electric power generation system, according to an embodiment.

FIG. 1 illustrates a microgrid electric power generation system 100 including an AC electric power bus 102, one or more combustion generators 104 electrically coupled to electric power bus 102, and one or more kinetic generators 108 electrically coupled to electric power bus 102 via a respective power converter in the form of an AC-to-AC converter 110. Although not required, it is anticipated that load 112, symbolically shown as a single element in FIG. 1 for illustrative clarity, is also electrically coupled to electric power bus 102. Load 112 represents electric load of one or more elements electrically coupled to electric power bus 102 that are powered from electric power bus 102. For example, in a drilling rig application of system 100, load 112 may represent electric load of elements such as drawworks, winches, HPUs, electric thrusters, mud pumps, top drives, rotary tables, dynamic braking systems, and peripheral electrical loads. Load 112 may include electric load of elements directly connected to electric power bus 102, as well electric load of elements connected to another electric power bus, such as a DC electric power bus or another AC electric power bus, that is electrically coupled to electric power bus 102. In some cases, load 112 may be negative, such as in cases where load 112 includes electric load of hoisting equipment or other equipment operating in a regenerative braking mode. Although FIG. 1 illustrates two instances of combustion generator 104 and two instances of kinetic generator 108, the number of each of these instances may vary without departing from the scope hereof.

Each combustion generator 104 includes a combustion engine, such as a diesel engine, mechanically driving an AC generator electrically coupled to electric power bus 102, such that each combustion generator 104 is capable of providing electric power to electric power bus 102. In some embodiments, electric power bus 102 is a three-phase bus, and each combustion generator 104 is a three-phase generator. A nominal voltage $V_{bus}$ on electric power bus 102 is, for example, 690 volts in low-voltage applications of system 100, and nominal voltage $V_{bus}$ is 6.6 to 11 kilovolts in certain embodiments of system 100 in high-voltage applications of system 100. However, nominal magnitude of voltage $V_{bus}$ may vary without departing from scope hereof. System 100 optionally further includes a respective circuit breaker (not shown) electrically coupled between each combustion generator 104 and electric power bus 102.

Kinetic generators 108 are capable of storing energy in kinetic form. Kinetic generators 108 receive energy for storage from electric power bus 102 in an acceleration mode, where energy on electric power bus 102 is provided by combustion generators 104 and/or by a regenerative braking component of load 112. Kinetic generators 108 are additionally capable of efficiently delivering energy stored therein back to electric power bus 102 in a generator mode. Importantly, kinetic generators 108 have a large energy storage capacity and are capable of quickly responding to a change in load. Kinetic generators 108 are also capable of storing and delivering energy at a high rate. In particular embodiments, each kinetic generator 108 (a) is capable of responding to a change in load within ten milliseconds, or within one millisecond in some embodiments, (b) has an energy storage capacity of at least 100 kilowatt hours (kWh), and (c) has a maximum peak power output of at least one megawatt (MW). Additionally, in some embodiments, all kinetic generator 108 instances collectively have an energy storage capacity of at least one megawatt hour (MWh) and are capable of providing an output power of at least 1 MW for five or more minutes. Additionally, in certain embodiments, kinetic generators 108 collectively have a maximum power output that is at least as great as that of any one combustion generator 104 instance, such as 4-10 MW. As discussed below, these features of kinetic generators 108 help system 100 achieve significant advantages compared to conventional microgrid electric power generator systems. In particular embodiments, each kinetic generator 108 has horizontal extent of less than 2 meters, such as 1.5 meters to promote small system size.

Figure 2:
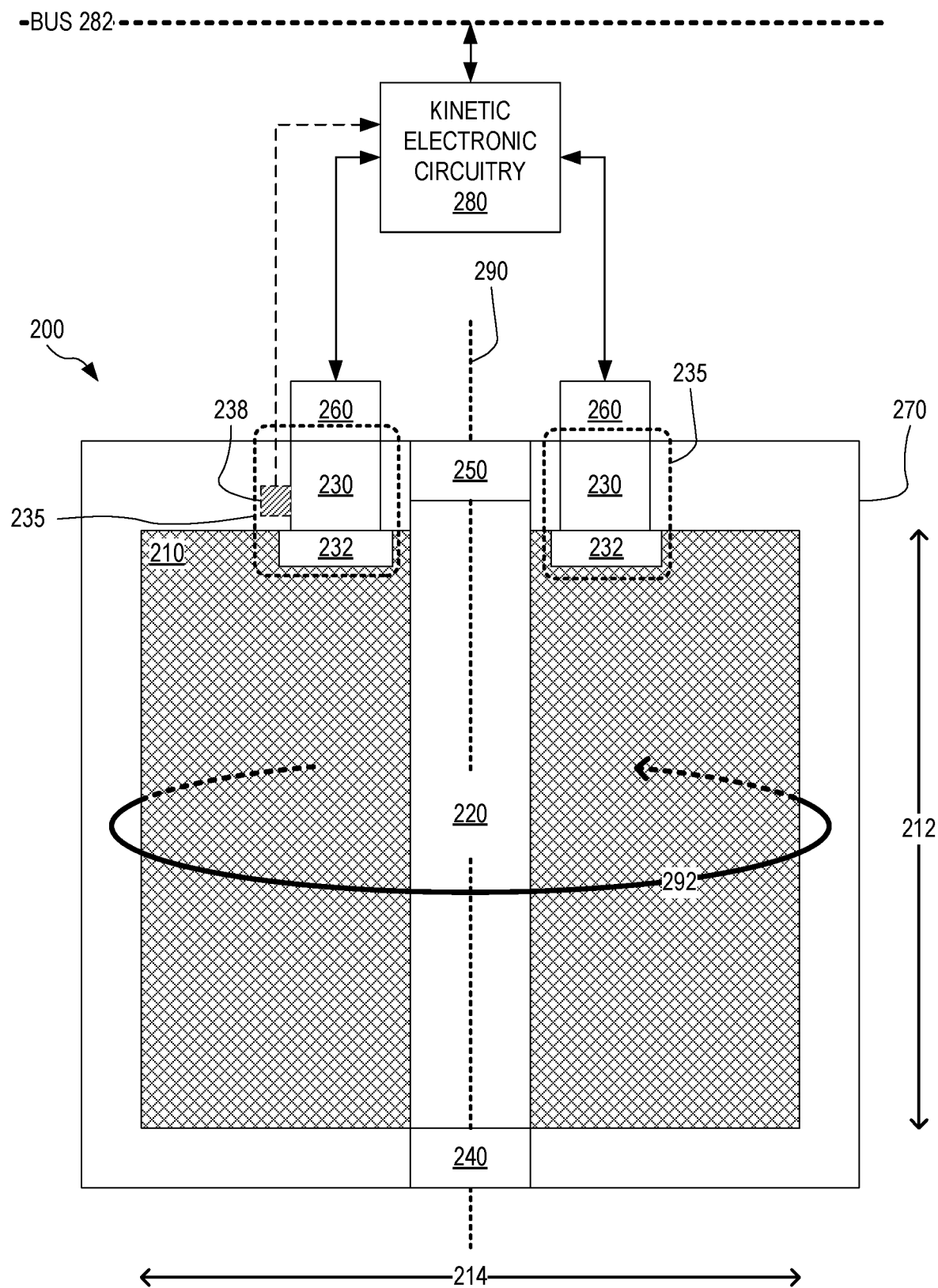
FIG. 2 illustrates a kinetic generator, according to an embodiment.

FIG. 2 illustrates a kinetic generator 200, which is one exemplary embodiment of kinetic generator 108. Kinetic generator 200 is capable of (a) converting electrical energy to kinetic energy in the form of rotational energy at high efficiency, (b) storing the kinetic energy with low loss, and (c) converting the kinetic energy to electrical energy at high efficiency. Kinetic generator 200 includes a rotor 210 and a shaft 220. Rotor 210 is mechanically and rigidly coupled with shaft 220, and rotor 210 and shaft 220 are configured to rotate about an axis 290 in a direction 292. Direction 292 may be opposite that shown in FIG. 2 without departing from the scope hereof. FIG. 2 shows kinetic generator 200 in cross-sectional view, with the cross section including axis 290.

Kinetic generator 200 is configured to be coupled to an electric bus 282 via kinetic electronic circuitry 280. Kinetic electronic circuitry 280 encompasses, for example, an instance of AC-to-AC converter 110 and an instance of second control subsystem 120 (discussed below). Bus 282 is, for example, electric power bus 102 of FIG. 1. Kinetic generator 200 generates and delivers electrical energy to bus 282 via kinetic electronic circuitry 280, or receives electrical energy from bus 282 via kinetic electronic circuitry 280. Kinetic electronic circuitry 280 controls whether kinetic generator 200 is operating in generator mode, acceleration mode, or passive storage mode. In generator mode, kinetic generator 200 converts kinetic energy stored in the rotation of rotor 210 to electrical energy to be delivered to bus 282. In acceleration mode, kinetic generator 200 uses electrical energy received from bus 282 to accelerate the rotation of rotor 210 about axis 290. In passive storage mode, kinetic generator 200 neither receives nor generates electrical energy. The direction 292 of rotation about axis 290 is the same in generator mode, acceleration mode, and passive storage mode. Kinetic generator 200 may switch between any two of these modes with a response time of less than 25 milliseconds, such as in the range between 0.1 and 50.0 milliseconds or in the range between 0.1 and 1.0 milliseconds. In one exemplary scenario, kinetic electronic circuitry 280 switches the operation mode of kinetic generator 200 from acceleration mode or passive storage mode to a maximum power output of the generator mode within the response time stated above. These fast response times allow kinetic generator 200 to respond to changes in load at a time scale much faster than that achievable by a combustion generator. Thus, kinetic generator 200 is capable of performing peak shaving and, for example, remove voltage drops caused by increases in power demand at a time scale of about a millisecond or a fraction of a millisecond. For comparison, the response time of a combustion generator is on the order of seconds or more, and the response time of a battery is on the order of about 100 milliseconds or more. Supercapacitors are capable of responding with a time scale of the order of milliseconds. However, the energy capacity of a conventional supercapacitor, or even a conventional supercapacitor array, is orders of magnitude lower than the energy capacity of kinetic generator 200.

In one example, the maximum power output of kinetic generator 200 is in the range between 0.5 and 1.5 megawatt (MW), such as approximately 1.0 MW.

In certain embodiments, rotor 210 has height 212 and a cylindrical outer circumference with diameter 214. Height 212 is no greater than 3 meters, for example in the range between 1.0 and 2.5 meters such as around 1.8 meters, in some embodiments. Diameter 214 is no greater than 2.5 meters, for example in the range between 1.0 and 2.0 meters such as around 1.5 meters, in some embodiments. The weight of rotor 210 is no greater than 2000 kilograms (kg), for example in the range between 1000 and 1500 kg such as around 1250 kg, in particular embodiments. Rotor 210 may be substantially composed of a carbon composite.

Kinetic generator 200 is capable of achieving a high rotational speed. In an embodiment, rotor 210 may achieve a rotational speed of at least 15,000 revolutions per minute (rpm) about axis 290, for example approximately 50,000 rpm or between 30,000 rpm and at least 60,000 rpm. This high rotational speed enables high energy capacity of kinetic generator 200. In one embodiment, the energy capacity of kinetic generator 200 is in the range between 50 and 200 kilowatt-hours (kWh). Kinetic generator 200 is therefore capable of generating electrical energy at a significant rate for longer periods of time. As a result, kinetic generator 200 is capable of providing electric power at a short response time (as discussed above) and at a high power output and also generate power over a longer period of time (such as seconds, minutes, or longer). Kinetic generator 200 thus provides, in one device, (a) the power output and response time similar to that achievable by a supercapacitor array or a conventional flywheel and (b) longer term power generation similar to that of a battery or battery array. Due to relatively low energy capacity, supercapacitors and conventional flywheels are generally not capable of generating energy over a longer period of time (such as seconds or minutes). Furthermore, a supercapacitor array capable of producing several MW of output power would have physical dimensions that significantly exceed those characteristic of kinetic generator 200 (e.g., height 212 and diameter 214). Likewise, a battery or battery array capable of matching the energy capacity of kinetic generator 200 will have physical dimensions greatly exceeding those of kinetic generator 200. A conventional flywheel scaled up to achieve the energy capacity of kinetic generator 200 would require a flywheel with physical dimensions greatly exceeding those of rotor 210. These dimensions are not practical for implementation onboard an offshore drilling vessel or other maritime vessel, due to the limited space onboard such vessels. In addition, a conventional flywheel scaled up in size to achieve the energy capacity of kinetic generator 200 would be orders of magnitude more expensive than kinetic generator 200.

In one implementation, the energy capacity of kinetic generator 200 is approximately 100 kWh. This implementation facilitates a power output of approximately 1 MW, which matches the power rating of certain standard electrical components that may be used to interface kinetic generator 200 with electric power bus 102. In another implementation, the energy capacity of kinetic generator 200 is less than 100 kWh, such as in the range between 10 kWh and 25 kWh. In this implementation, kinetic generator 200 may serve to power a single machine onboard an offshore drilling vessel.

In yet another implementation, several kinetic generators 200 cooperate to achieve a combined energy capacity of up to at least 2,000 kWh. For example, four kinetic generators 200 may have a combined energy capacity of at least 200 kWh or at least 400 kWh and a maximum power output of at least 2 MW or at least 4 MW, respectively. For such kinetic generators 200 may be implemented onboard a jackup offshore drilling rig. In another example, which may be implemented onboard a semi-submersible offshore drilling rig, twelve kinetic generators 200 cooperate to provide a combined energy capacity of at least 600 kWh or at least 1200 kWh and a maximum power output of at least 6 MW or at least 12 MW, respectively. A semi-submersible offshore drilling rig typically relies on dynamic positioning to maintain its position relative to the well and therefore present greater energy demands than a typical jackup offshore drilling rig. In a further example, sixteen kinetic generators 200 cooperate to provide a combined energy capacity of at least 800 kWh or at least 1600 kWh and a maximum power output of at least 8 MW or at least 16 MW, respectively. Such a set of sixteen kinetic generators 200 may advantageously be implemented onboard a drillship having even greater energy demands than that typically associated with a semi-submersible offshore drilling rig. It is understood that these implementations and examples are non-limiting and that a different number of kinetic generators 200 may be implemented together to achieve a wide range of energy capacities and maximum power outputs.

In one exemplary scenario of kinetic generator 200 operating in generator mode for a sustained period of time, kinetic generator 200 generates 1 MW for up to approximately 2-3 minutes. In another exemplary use scenario, kinetic generator 200 performs peak shaving to ensure stable voltage on bus 282. Kinetic generator 200 is capable of simultaneously (a) performing peak shaving, and (b) operating in generator mode for a sustained period of time, for example to handle a power demand otherwise requiring a combustion generator.

Kinetic generator 200 is capable of achieving the above stated response times, power outputs, and energy capacities in a relatively small and lightweight package (as stated above). The lightweight package ensures compatibility of kinetic generator 200 with operation onboard an offshore drilling vessel. Operation onboard an offshore drilling vessel (or other maritime vessel) is associated with spatial constraints and, due to movement of the vessel, imposes challenging demands on the structural integrity and stability of kinetic generator 200. Kinetic generator 200 achieves the above stated performance parameters, at least in part, by being efficient. This high efficiency is facilitated by minimized air drag and minimized friction between mechanical components during rotation of rotor 210 and shaft 220, even when kinetic generator 200 is located onboard an offshore drilling vessel and subject to the movements characteristic of that environment.

For the purpose of minimizing air drag on rotor 210, kinetic generator 200 includes a sealed vacuum enclosure 270 that contains rotor 210 and shaft 220 in a vacuum environment. Vacuum enclosure 270 also eliminates exposure to oxygen and moisture, which extends the life of the internal components of kinetic generator 200.

For the purpose of reducing mechanical friction between rotating and stationary parts, kinetic generator 200 is configured with low-friction bearings. Kinetic generator 200 includes a lower bearing system 240, and an upper bearing system 250. Bearing systems 240 and 250 cooperate to support rotor 210 relative to vacuum enclosure 270 via shaft 220. Kinetic generator 200 is configured for rotation about a mostly vertical orientation of axis 290, that is, for rotation about axis 290 mostly parallel to the direction of gravity. It is understood that, onboard an offshore drilling vessel, the orientation of axis 290 may vary significantly. Kinetic generator 200 is configured to achieve the above stated performance parameters in the presence of movement typical of that associated with an offshore drilling vessel. However, the average orientation of axis 290 is assumed to be approximately parallel to the direction of gravity, at least to within approximately 15 degrees. Lower bearing system 240 supports the weight of rotor 210 via shaft 220. Lower and upper bearing systems 240 and 250 cooperate to stabilize the position of shaft 220 in dimensions orthogonal to axis 290.

Kinetic generator 200 further includes a generator module 235 having at least two coils 230 and at least two permanent magnets 232. Generator module 235 converts electrical energy to rotational energy of rotor 210 or generates electrical energy from the rotational energy of rotor 210, depending on the operating mode of kinetic generator 200. Magnets 232 may include or be composed of a ferromagnetic material. Magnets 232 are mechanically and rigidly coupled with rotor 210, either directly as shown in FIG. 2 and/or indirectly via shaft 220. Coils 230 are mechanically and rigidly coupled with vacuum enclosure 270 and further electrically couple with kinetic electronic circuitry 280 via one or more connectors 260. During rotation of rotor 210 about axis 290, magnets 232 pass by coils 230 and magnetically coupled therewith. Both coils 230 and magnets 232 are arranged at different locations along direction 292. Magnets 232 generate magnetic fields that are substantially orthogonal to direction 292, or at least predominantly orthogonal to direction 292.

In one embodiment, generator module 235 includes one magnet 232 for each coil 230 to form a series of magnets 232 along direction 292 about axis 290. In an example of this embodiment, magnets 232 are equidistantly spaced along direction 292 and coils 230 are equidistantly spaced along direction 292. In another embodiment, kinetic generator 200 includes a pair of magnets 232 for each coil 230. In this embodiment, the magnets 232 of each pair of magnets 232 are placed on opposite sides of the travel path of coils 230 during rotation of rotor 210 when viewed from the rest frame of rotor 210. Each pair of magnets 232 forms a magnetic field between the two magnets 232 of the pair. In an example of this embodiment, pairs of magnets 232 are equidistantly spaced along direction 292, and coils 230 are equidistantly spaced along direction 292.

In generator mode, magnets 232 rotate with rotor 210 about axis 290 and induce a current in coils 230. This current is delivered to bus 282 via kinetic electronic circuitry 280. During generator mode, the rotation speed of rotor 210 decreases as the kinetic energy of rotor 210 is converted to electrical energy. In one example of generator mode, kinetic electronic circuitry 280 is configured to convert AC electrical energy thus generated by kinetic generator 200 to AC electrical energy of a different frequency than that resulting from the rate of magnets 232 passing by coils 230, such as for compatibility with electric power bus 102. In another example of generator mode, kinetic electronic circuitry 280 is configured to convert AC electrical energy thus generated by kinetic generator 200 to DC electrical energy, such as for use in the system of FIG. 12 discussed below.

In acceleration mode, kinetic electronic circuitry 280 passes current through coils 230. This current magnetically couples with the magnetic fields generated by magnets 232 to move rotor 210 toward a preferred position (the polar aligned position) of magnets 232 relative to coils 230. Thus, coils 230 apply a torque to rotor 210 to increase the rotation speed of rotor 210. As a result, the amount of kinetic energy carried by rotor 210 increases. Kinetic electronic circuitry 280 actively switches the direction of current through coils 230 shortly before magnets 232 reach the preferred position relative to coils 230. Due to this active switching of the current direction through coils 230, the previously favored position of magnets 232 relative to coils 230 becomes the least favored position. Consequently, magnets 232 force rotor 210 to continue rotating along direction 292 past the previously preferred position to a new preferred position. Continued switching by kinetic electronic circuitry 280 results in continued acceleration of rotor 210 until a maximum rotational speed is reached or until kinetic generator 200 switches to generator mode or passive storage mode. Rotation of rotor 210 at maximum rotational speed corresponds to kinetic generator 200 achieving its full energy capacity. Exemplary values for the full energy capacity of kinetic generator 200 are discussed above.

In an embodiment, when viewing the series of coils 230 and the series of magnets 232 (or pairs of magnets 232) along direction 292, magnets 232 (or pairs of magnets 232) are arranged to generate magnetic fields of alternating direction and coils 230 have alternating polarity. In this embodiment, any single coil 230 will, during rotation of rotor 210, experience magnetic fields generated by magnets 232 of alternating direction (see exemplary illustrations in FIGS. 4B and 5A). When kinetic electronic circuitry 280 actively switches the current direction through coils 230 during acceleration mode just prior to reaching alignment with one coil 230, the new preferred position after active switching, is where each magnet 232 (or pair of magnets 232) is aligned with a subsequent coil 230 along direction 292.

Generator module 235 may include one or more sensors 238. Each sensor 238 is for example a Hall sensor. Each sensor 238 communicates a magnetic flux value (or associated parameter) to kinetic electronic circuitry 280. The data received from sensor 238 indicates the positions of coils 230 relative to magnets 232. Kinetic electronic circuitry 280 may use the data received from sensor(s) 238 to determine when to switch the direction of current through coils 230, so as to optimize the efficiency of conversion of electrical energy to kinetic energy.

In certain embodiments, coils 230 have no ferromagnetic core. Such absence of ferromagnetic cores eliminates hysteresis losses otherwise incurred when magnets 232 pass by coils 230 during rotation of rotor 210 about axis 290. The absence of ferromagnetic cores therefore helps reduce loss of rotational energy of rotor 210, especially during passive storage mode.

Without departing from the scope hereof, rotor 210 may be separated by shaft 220 at least for some portions of height 212, so as to center the weight of rotor 210 at greater radii. For example, kinetic generator 200 may include a hub that affixes rotor 210 to shaft 220.

Figure 3:
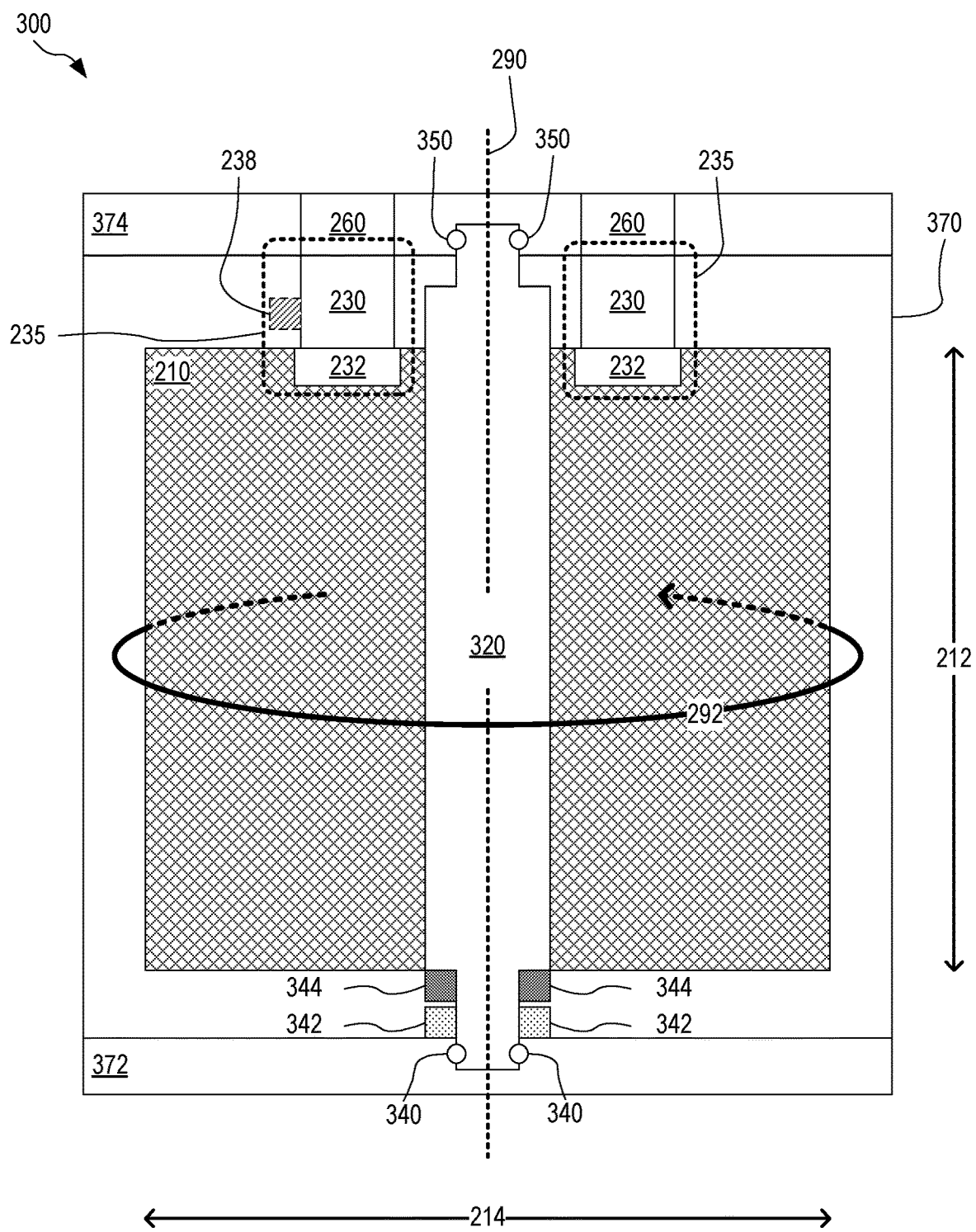
FIG. 3 illustrates a kinetic generator with a magnetically levitating rotor, according to an embodiment.

FIG. 3 illustrates one exemplary kinetic generator 300 with a magnetically levitating rotor 210. FIG. 3 shows kinetic generator 300 in cross-sectional view, with the cross section including axis 290. Kinetic generator 300 is an embodiment of kinetic generator 200. Kinetic generator 300 implements vacuum enclosure 270 as a vacuum enclosure 370 having (a) a bottom plate 372 that contacts a shaft 320 via one set of bearings and (b) a top plate 374 that contacts shaft 320 via another set of bearings. Shaft 320 is an embodiment of shaft 220. Kinetic generator 300 includes one or more permanent magnets 342 mechanically coupled with bottom plate 372, and one or more permanent magnets 344 mechanically coupled with shaft 320 (or, alternatively, rotor 210). Magnets 342 repel magnets 344 to support the weight of rotor 210, shaft 320, and other elements attached to rotor 210 and/or shaft 320, through magnetic levitation. Kinetic generator 300 also includes a magnetic bearing system 340 to stabilize the position of shaft 320 relative to bottom plate 372 in dimensions orthogonal to axis 290. Permanent magnets 342 and 344 and magnetic bearing system 340 together form an embodiment of lower bearing system 240. Additionally, kinetic generator 300 includes a magnetic bearing system 350 to stabilize the position of shaft 320 relative to top plate 374 in dimensions orthogonal to axis 290. Magnetic bearing systems 340 and 350 secure and stabilize shaft 220 and rotor 210 in the presence of the movement experienced onboard an offshore drilling vessel. Magnetic bearing systems 340 and 350 ensure continued operation of kinetic generator 300 in the offshore vessel environment, as well as minimize wear of kinetic generator 300 and prevent damage to kinetic generator 300. In one implementation, each of magnetic bearing systems 340 and 350 includes permanent magnets mounted to both shaft 220 and the respective one of bottom plate 372 and top plate 374. These permanent magnets may be configured to stabilize the position of shaft 220 relative to the respective one of bottom plate 372 and top plate 374 via repulsive or attractive magnetic forces. One or both of magnetic bearing systems 340 and 350 may include a combination of different types of bearings.

Figure 4A:
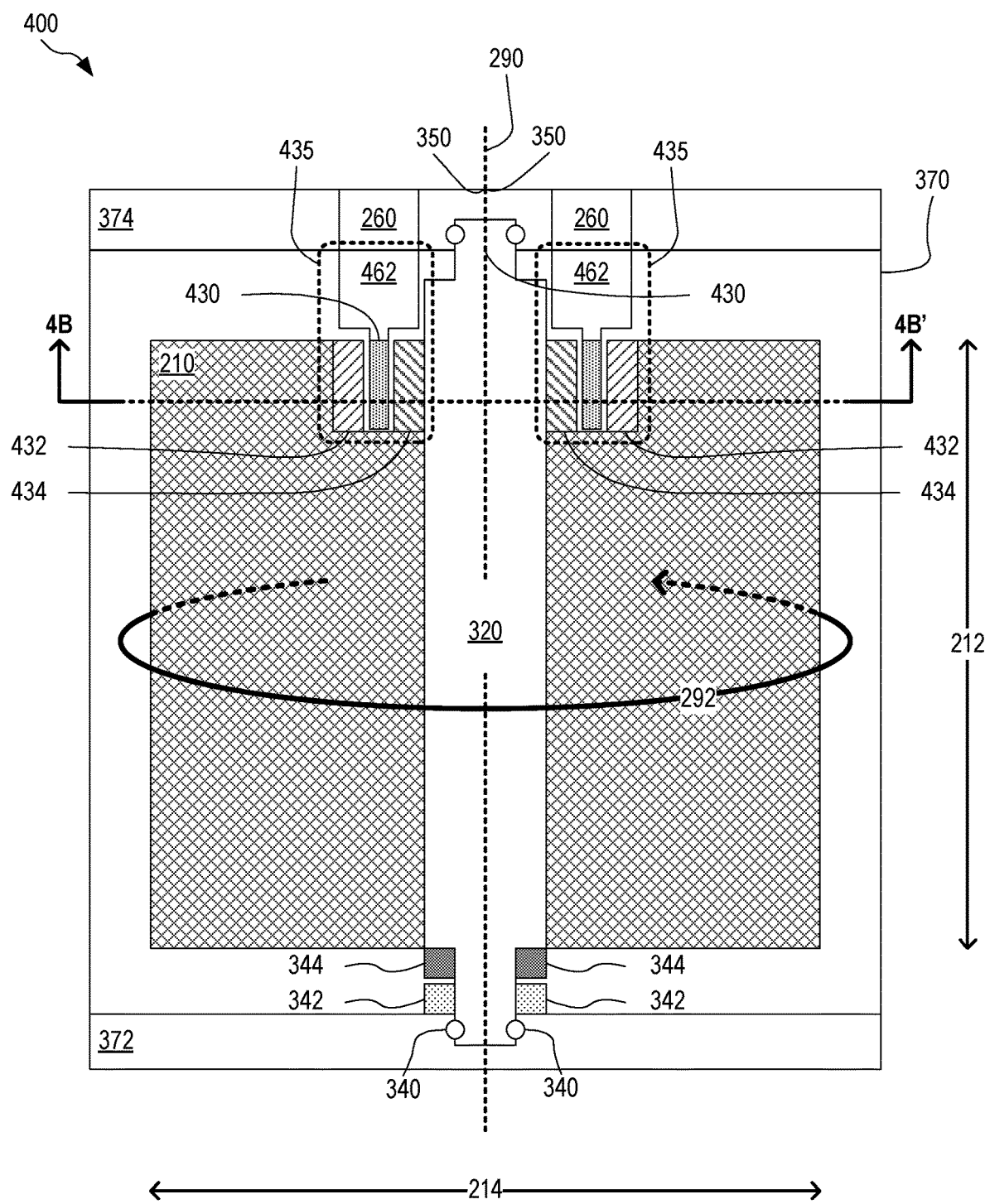
FIGS. 4A and 4B illustrate a kinetic generator with a magnetically levitating rotor and a generator module that implements vertically oriented coils, according to an embodiment.
Figure 4B:
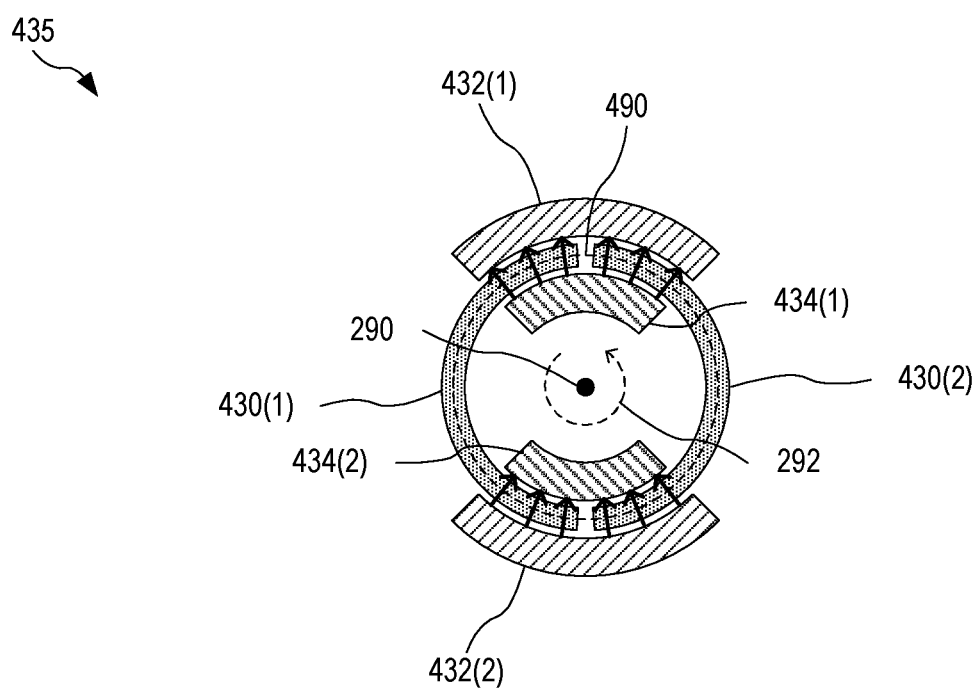

FIGS. 4A and 4B illustrate one exemplary kinetic generator 400 with a magnetically levitating rotor 210 and a generator module 435 that implements coils 230 as vertically oriented coils 430. FIG. 4A shows kinetic generator 400 in cross-sectional view, with the cross section including axis 290. FIG. 4B shows generator module 435 in a cross-sectional view that is orthogonal to that of FIG. 4A and that includes line 4B-4B' shown in FIG. 4A. FIGS. 4A and 4B are best viewed together.

Kinetic generator 400 is an embodiment of kinetic generator 300, which implements generator module 235 as generator module 435. Generator module 435, in turn, implements coils 230 as vertically oriented coils 430 coupled to top plate 374 via couplers 462. Couplers 462 mechanically and electrically connect coils 430 to top plate 374 and connectors 260, respectively. Without departing from the scope hereof, couplers 462 may be integrated in top plate 374. Each coil 430 is located on a virtual cylinder surface 490, and the current running through each coil 430 has components parallel to axis 290 and components parallel to direction 292. For example, the current through a coil 430 may run upwards in a direction parallel to axis 290, then in a direction parallel to direction 292, then downwards in a direction parallel to axis 290, then in a direction antiparallel to direction 292 to form a closed loop. Generator module 435 includes (a) a plurality of outer permanent magnets 432 mounted to rotor 210, and (b) a plurality of inner permanent magnets 434 mounted to shaft 320. When viewed from the rest frame of rotor 210, the path traveled by coils 430 (during rotation of rotor 210 about axis 290) passes between outer magnets 432 and inner magnets 434.

FIG. 4B shows an example of generator module 435 that includes two outer magnets 432, two inner magnets 434, and two coils 430. Without departing from the scope hereof, generator module 435 may be extended to include a larger number of outer magnets 432, inner magnets 434, and coils 430, as long as the number of outer magnets 432 equals that of inner magnets 434 and the number of outer magnets 432 equals that of coils 430. Each outer magnet 432 faces a corresponding inner magnet 434 to form magnetic field lines therebetween. As a result, each pair of an outer magnet 432 and a corresponding inner magnet 434 forms a magnetic field that each coil 430 passes through during rotation of rotor 210 (as viewed from the rest frame of rotor 210). When viewed along direction 292, the direction of the magnetic field between corresponding magnets 432 and 434 alternates. For example, in the example shown in FIG. 4B, the magnetic field between outer magnet 432(1) and inner magnet 434(1) points away from axis 290, while the magnetic field between outer magnet 432(2) and inner magnet 434(2) points toward axis 290. In certain embodiments, the magnetic field lines formed by outer magnets 432 and inner magnets 434 form closed loops running in a direction through inner magnet 434(1) to outer magnet 432(1) to outer magnet 432(2) to inner magnet 434(2) and back to inner magnet 434(1) (or the opposite direction to what is described here). The closed loops of field lines may be substantially confined to a plane orthogonal to axis 290. In an embodiment, when viewing the series of coils 430 along direction 292, coils 430 have alternating polarity.

Although not shown in FIGS. 4A and 4B, generator module 435 may include sensor(s) 238 as discussed above in reference to FIG. 2.

Figure 5A:
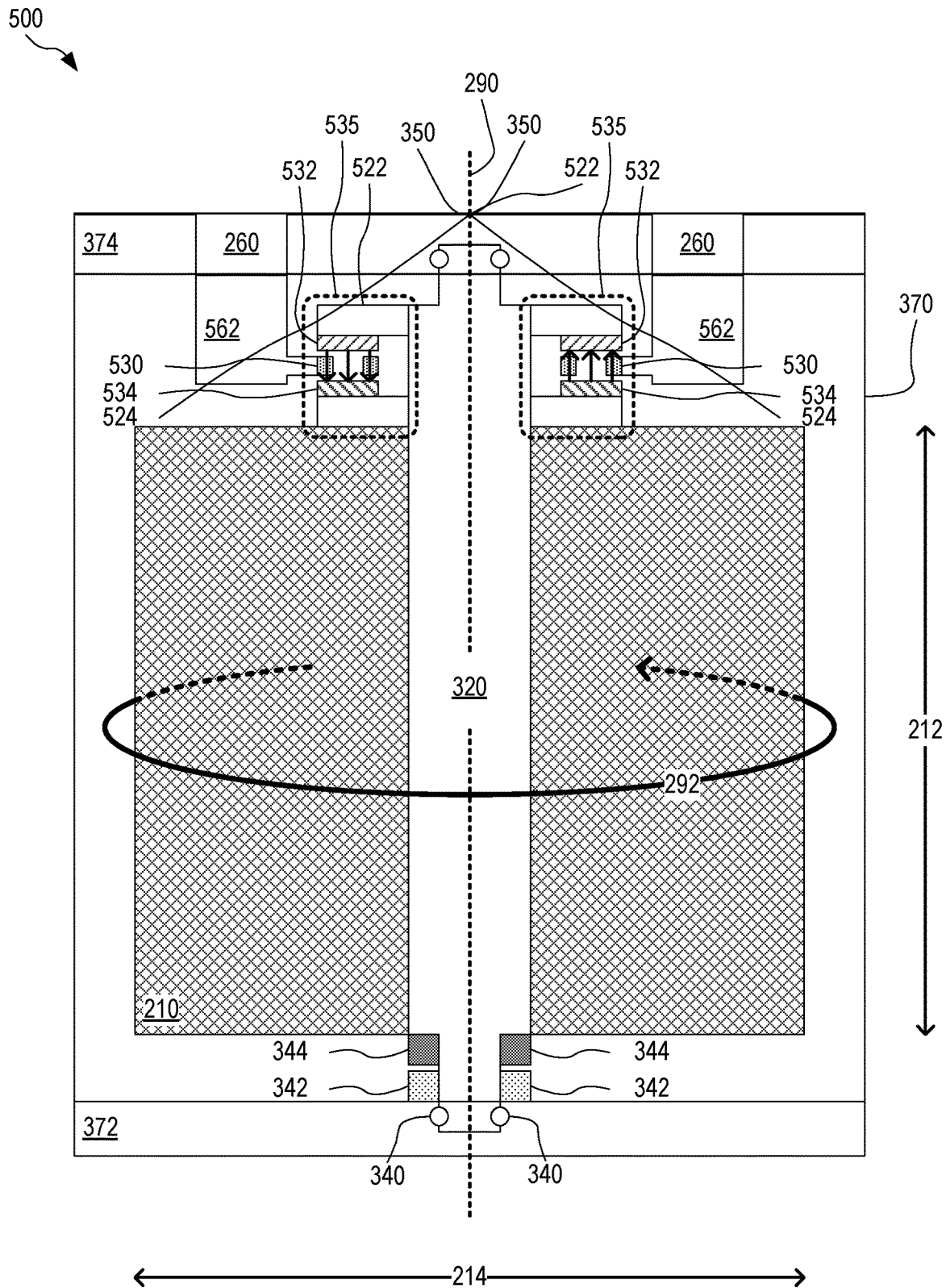
FIGS. 5A and 5B illustrate a kinetic generator with a magnetically levitating rotor and a generator module implementing horizontally oriented coils, according to an embodiment.
Figure 5B:
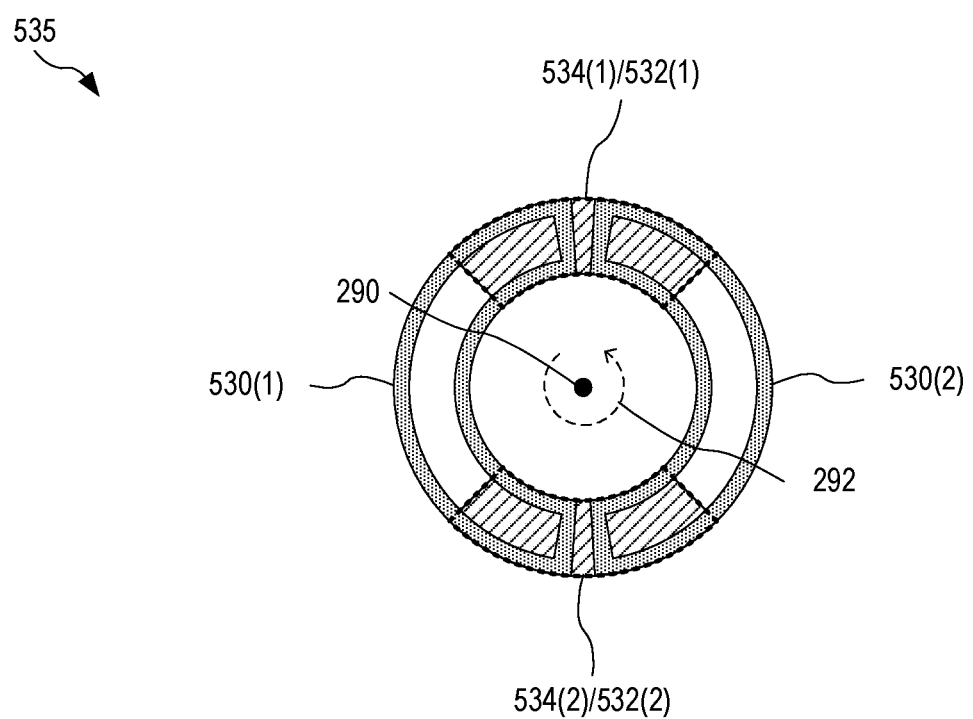

FIGS. 5A and 5B illustrate one exemplary kinetic generator 500 with a magnetically levitating rotor 210 and a generator module 535 that implements coils 230 as horizontally oriented coils 530. FIG. 5A shows kinetic generator 500 in cross-sectional view, with the cross section including axis 290. FIG. 5B shows a portion of generator module 535 in a projection view along axis 290. FIGS. 5A and 5B are best viewed together.

Kinetic generator 500 is an embodiment of kinetic generator 300, which implements generator module 235 as generator module 535. In turn, generator module 535 implements coils 230 as horizontally oriented coils 530 coupled to top plate 374 via couplers 562. Couplers 562 mechanically and electrically connect coils 530 to top plate 374 and connectors 260, respectively. Without departing from the scope hereof, couplers 562 may be integrated in top plate 374. Generator module 535 includes (a) a plurality of upper permanent magnets 532 mounted to shaft 320 via an upper disc 522, and (b) a plurality of lower permanent magnets 534 mounted to shaft 320 via a lower disc 524. When viewed from the rest frame of rotor 210, the path traveled by coils 530 (during rotation of rotor 210 about axis 290) passes between upper magnets 532 and lower magnets 534. Upper disc 522 and lower disc 524 may be ferromagnetic to help guide magnetic fields generated by magnets 532 and 534.

FIG. 5B illustrates an example of generator module 535 that includes two upper magnets 532, two lower magnets 534, and two coils 530. Without departing from the scope hereof, generator module 535 may be extended to include a larger number of upper magnets 532, lower magnets 534, and coils 530, as long as the number of upper magnets 532 equals that of lower magnets 534 and the number of upper magnets 532 equals that of coils 530. Each upper magnet 532 faces a corresponding lower magnet 534 to form magnetic field lines therebetween. As a result, each pair of an upper magnet 532 and a corresponding lower magnet 534 forms a magnetic field that each coils 530 passes through during rotation of rotor 210 (as viewed from the rest frame of rotor 210). Along direction 292, the direction of the magnetic field between corresponding magnets 532 and 534 alternates. For example, in the example shown in FIG. 5B, the magnetic field between upper magnet 532(1) and lower magnet 534(1) points in one direction parallel to axis 290, while the magnetic field between upper magnet 532(2) and lower magnet 534(2) points in the opposite direction parallel to axis 290. In certain embodiments, the magnetic field lines formed by upper magnets 532 and lower magnets 534 form closed loops running in a direction through upper magnet 532(1) through lower magnet 534(1), through lower disc 524, across shaft 320, through lower disc 524, through lower magnet 534(2), to upper magnet 532(2), through upper disc 522, across shaft 320, and through upper disc 522 to upper magnet 532(1) (or the opposite direction to what is described here). The closed loops of field lines may be substantially confined to planes parallel to axis 290 and orthogonal to direction 292. In an embodiment, when viewing the series of coils 530 along direction 292, coils 530 have alternating polarity.

Although not shown in FIGS. 5A and 5B, generator module 535 may include sensor(s) 238 as discussed above in reference to FIG. 2.

Returning to FIG. 1, AC-to-AC converters 110 are, for example, bidirectional switching power converters capable of transferring electric power between their respective kinetic generators 108 and electric power bus 102. In certain embodiments, AC-to-AC converters 110 convert magnitude of voltage outputted by their respective kinetic generator 108 to a magnitude compatible with electric power bus 102, when kinetic generators 108 are operating in generator mode. On the other hand, when kinetic generators 108 are operating in acceleration mode, AC-to-AC converters 110 convert magnitude of voltage $V_{bus}$ on electric power bus 102 to a magnitude compatible with kinetic generators 108. In some embodiments, each AC-to-AC converter 110 includes two or more power stages, such as two H-bridge power stages, to realize bidirectional power transfer. System 100 optionally further includes a respective circuit breaker (not shown) electrically coupled between each kinetic generator 108 and electric power bus 102.

System 100 additionally includes a respective first control subsystem 118 for each combustion generator 104, a respective second control subsystem 120 for each kinetic generator 108, and a power management subsystem 122, for controlling system 100. Each first control subsystem 118 and its respective combustion generator 104 collectively form a combustion power source 124. Each first control subsystem 118 is configured to control delivery of power by its respective combustion generator 104 to electric power bus 102.

In a particular embodiment, each first control subsystem 118 includes an automatic voltage regulator (AVR) and a governor to control its respective combustion generator 104. The AVR is configured to control current to field windings of the AC generator, and the governor is configured to control fuel to the combustion engine. In some embodiments, each first control subsystem 118 controls power delivery of its respective combustion generator 104 to electric power bus 102 at least partially based on a first control signal 130 from power management subsystem 122. First control signal 130 represents, for example, an operating state of kinetic generators 108, such as kinetic energy storage level of kinetic generators 108, kinetic energy loss rate of the kinetic generators 108, and/or whether kinetic generators 108 are operating in generator or acceleration mode.

In some embodiments, kinetic generators 108 have sufficiently large capacity and respond quickly enough to load changes such that there is no need for combustion generators 104 to regulate voltage $V_{bus}$ on electric power bus 102. In these embodiments, each first control subsystem 118 optionally controls power delivery of its respective combustion generator 104 to electric power bus 102 independent of voltage $V_{bus}$ on electric power bus 102, or in other words, without consideration of voltage $V_{bus}$ on electric power bus 102. In some other embodiments, each first control subsystem 118 controls power delivery of its respective combustion generator 104 to electric power bus 102 based at least in part on magnitude and/or frequency of voltage $V_{bus}$, to promote tight regulation of voltage $V_{bus}$. Even in these embodiments, however, it is anticipated that first control subsystems 118 will frequently not need to vary operation of their respective combustion generators 104 in response to transient load events because of the fast response and large energy storage capacity of kinetic generators 108.

First control subsystems 118 optionally further promote equal sharing of load 112 among combustion generator 104 instances by implementing one or more of "droop" or "isochronous" (ISO) control schemes. Droop control is characterized by decreasing combustion engine speed with increasing magnitude of load 112, while ISO control is characterized by maintaining constant combustion engine speed across an expected range of load 112 magnitude.

Additionally, in some embodiments, each first control subsystem 118 is configured to control power output of its respective combustion generator 104 based at least in part on magnitude of load 112. For instance, in a particular embodiment, each first control subsystem 118 is configured to control power output of its respective combustion generator 104 based in part on a signal 132 representing magnitude of load 112 to achieve "feed forward" control, to improve regulation of voltage $V_{bus}$. In particular embodiments, signal 132 alternately or additionally represents an upcoming change in magnitude of load 112, thereby enabling each first control subsystem 118 to control its respective kinetic generator 108 to adjust its energy storage or delivery rate in anticipation of an upcoming load change.

Combustion generators 104 have significant inertia and are therefore inherently incapable of quickly responding to transient loads. Consequently, each combustion power source 124 has a respective time constant, i.e., a time required for the combustion power source to change its power output by at least ten percent, that is relatively large. In certain embodiments, each combustion power source 124 has a time constant of at least 100 milliseconds, one second, one minute, ten minutes, one hour, two hours, or one day. This time constant imposes a corresponding delay between (a) initiating a change in the operation of a combustion generator 104 and (b) the actual power output of combustion generator 104 beginning to change (for example by a measurable amount such as 5% in power output). Thus, in certain embodiments, it takes 100 milliseconds, one second, one minute, ten minutes, one hour, two hours, or one day from initiating a change in the operation of combustion generator 104 until the power output of combustion generator 104 exhibits a significant change. In addition, there is a delay between the power output of combustion generator 104 beginning to change and the combustion generator 104 reaching the desired power output.

Each second control subsystem 120 is configured to control the AC-to-AC converter 110 of its respective kinetic generator 108 and a motor/generator within the kinetic generator to control storage and delivery of energy of the kinetic generator. In particular, in acceleration mode of kinetic generators 108, each second control subsystem 120 controls the AC-to-AC converter 110 of its respective kinetic generator 108 and the motor/generator within the kinetic generator such that energy from electric power bus 102 is stored as kinetic energy in the kinetic generator. In generator mode of kinetic generators 108, each first control subsystem 118 controls the AC-to-AC converter 110 of its respective kinetic generator 108 and the motor/generator within the kinetic generator such that energy from the kinetic generator is delivered to electric power bus 102. Each second control subsystem 120 also controls its respective AC-to-AC converter 110 in generator mode of kinetic generators 108 such that output voltage of the AC-to-AC converter at electric power bus 102 is within a predetermined voltage range and a predetermined frequency range, thereby regulating voltage $V_{bus}$. In some embodiments, the predetermined voltage range is within +/– 99%, 95%, or 90% of a nominal magnitude of voltage $V_{bus}$. In certain embodiments, the predetermined frequency range is within +/– 99%, 95%, or 90% of a nominal frequency of voltage $V_{bus}$.

Each kinetic generator 108, its respective AC-to-AC converter 110, and its respective second control subsystem 120 may be collectively referred to as a kinetic energy subsystem 134. Power management subsystem 122 provides a second control signal 136 to each kinetic energy subsystem 134 specifying whether the kinetic energy subsystem 134 is to operate in acceleration mode or in generator mode. Each kinetic energy subsystem 134 operates in either acceleration mode or generator mode according to the state of signal 136.

Importantly, each kinetic energy subsystem 134 has a small time constant, i.e., time required for the kinetic energy subsystem 134 to change its power storage or power delivery by ten percent. For example, in a particular embodiment, each kinetic energy subsystem 134 has time constant of 10 milliseconds or less, such that the kinetic energy subsystem 134 is capable of changing its energy storage or delivery rate by 10% within 10 milliseconds of a change in magnitude of load 112. In another particular embodiment, each kinetic energy subsystem 134 has time constant of one millisecond or less, such that the kinetic energy subsystem 134 is capable of changing its energy storage or delivery rate by 10% within one millisecond of a change in magnitude of load 112. In another embodiment, each kinetic energy subsystem 134 has time constant of two milliseconds or less, such that the kinetic energy subsystem 134 is capable of changing its energy storage or delivery rate by 10% within two milliseconds of a change in magnitude of load 112. In yet another embodiment, each kinetic energy subsystem 134 has time constant of 300 milliseconds or less, such that the kinetic energy subsystem 134 is capable of changing its energy storage or delivery rate by 10% within 300 milliseconds of a change in magnitude of load 112. Such small time constant of kinetic energy subsystem 134 is achieved, in part, by use of kinetic generators 108 as energy delivery devices. If kinetic energy subsystems 134 instead relied on battery storage subsystems for energy delivery, it would be impossible to achieve the small time constant of kinetic energy subsystem 134 because a conventional battery storage subsystem cannot respond to a transient load nearly as quickly as kinetic generators 108. In some embodiments, the time constant of each kinetic energy subsystem 134 is no more than ten percent of the time constant of each combustion power source 124.

In some embodiments, each second control subsystem 120 is further configured to control the AC-to-AC converter 110 of its respective kinetic generator 108 and the motor/generator within the kinetic generator according to signal 132 representing magnitude of load 112, thereby achieving feed forward control, which promotes tight regulation of voltage $V_{bus}$. For example, in a particular embodiment, each second control subsystem 120 increases delivery of power by its respective kinetic generator 108 to electric power bus 102 in response to signal 132 indicating an increase in magnitude of load 112, and each second control subsystem 120 decreases delivery of power by its respective kinetic generator 108 to electric power bus 102 in response to signal 132 indicating a decrease in magnitude of load 112. In particular embodiments, signal 132 alternately or additionally represents an upcoming change in magnitude of load 112, thereby enabling each second control subsystem 120 to control its respective kinetic generator 108 to adjust its energy storage or delivery rate in anticipation of an upcoming load change.

In certain embodiments, each second control subsystem 120 changes operation in response to a change in load only if the change in load meets a predetermined criteria, such as the change in load having at least a minimum magnitude, transition time, and/or duration. For example, in a particular embodiment, each second control subsystem 120 changes operation in response to a change in load only if the load change meets the following criteria: (a) the load change magnitude is at least 1%, 5%, or 10% of the magnitude of the load before the change, (b) the load transition is less than 100 milliseconds or less than 500 milliseconds, and/or (c) the load change duration is at least 500 microseconds or at least 1 millisecond.

Power management subsystem 122 controls whether kinetic generators 108 operate in acceleration mode or generator mode, for example, depending on steady-state magnitude of load 112 compared to spinning reserve of combustion generators 104. For example, in one embodiment, power management subsystem 122 causes kinetic generators 108 to switch from acceleration mode to generator mode via second control signal 136 in response to magnitude of load 112 being greater than a first percentage of the spinning reserve, and power management subsystem 122 causes kinetic generators 108 to switch from generator mode to acceleration mode via second control signal 136 in response to magnitude of load 112 being less than a second percentage of the spinning reserve. In particular embodiments, power management subsystem 122 controls power output of combustion generators 104 via first control signal 130 depending on whether kinetic generators 108 are operating in acceleration or generator mode. For example, in some embodiments, power management subsystem 122 causes combustion generators 104 to increase their power output in response to kinetic generators 108 operating in acceleration mode for more than a predetermined amount of time. In some embodiments, power management subsystem 122 also generates magnitude of signal 132 representing magnitude of load 112, such from measurements of voltage $V_{bus}$ and magnitude of current to load 112.

In certain embodiments, power management subsystem 122 includes a processor (not shown) communicatively coupled to a memory (not shown), and power management subsystem 122 executes instructions in the form of firmware or software stored in the memory, to achieve the functions of power management subsystem 122. In some other embodiments, the processor and memory are replaced by, or supplemented with, other digital electrical circuitry and/or analog electrical circuitry.

Figure 6:
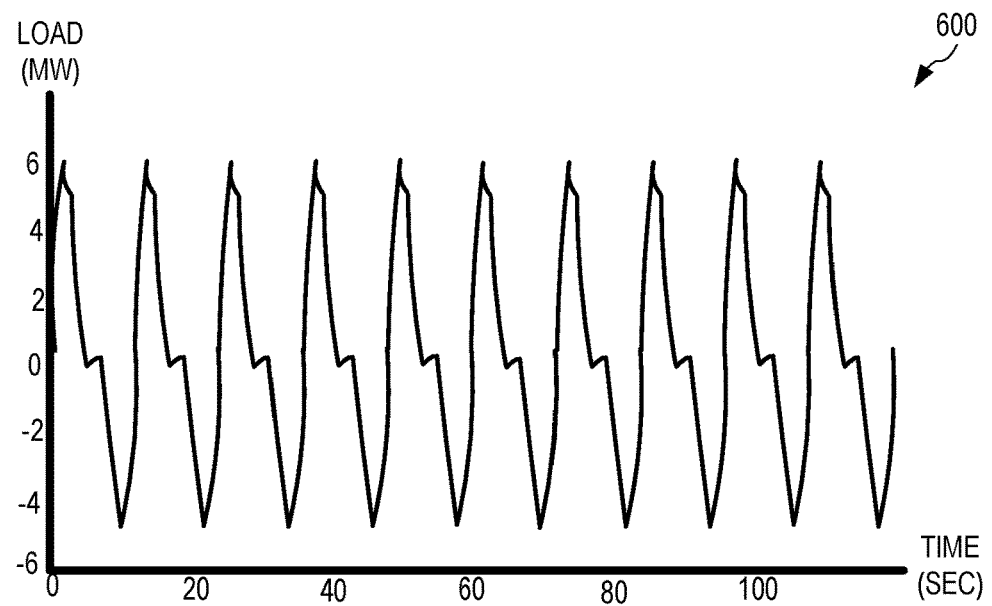
FIG. 6 is a graph of load versus time of an exemplary active heave drawworks.

System 100 may achieve significant advantages relative to conventional microgrid electric power generation systems. For example, the small time constant of kinetic energy subsystems 134 enables the kinetic energy subsystems to quickly respond to changes in load 112, thereby reducing or eliminating the need for supercapacitors in system 100. The ability of system 100 to support transient loads may be particularly significant in offshore drilling rig applications, which as discussed above, present significant transient loads. For example, FIG. 6 is a graph 600 of load versus time of an exemplary active heave drawworks (AHDW) showing how load can vary substantially in a matter of seconds. In certain embodiments, kinetic generators 108 are able to support such dynamic load, thereby promoting high performance of the drawworks, tight regulation of voltage $V_{bus}$ on electric power bus 102, and stable operation of combustion generators 104. Conventional systems, in contrast, may not be fully able to support the transient of load of FIG. 6, resulting in voltage distortion on an electric power bus and impaired operation of drawworks powered from the electric power bus.

Figure 7:
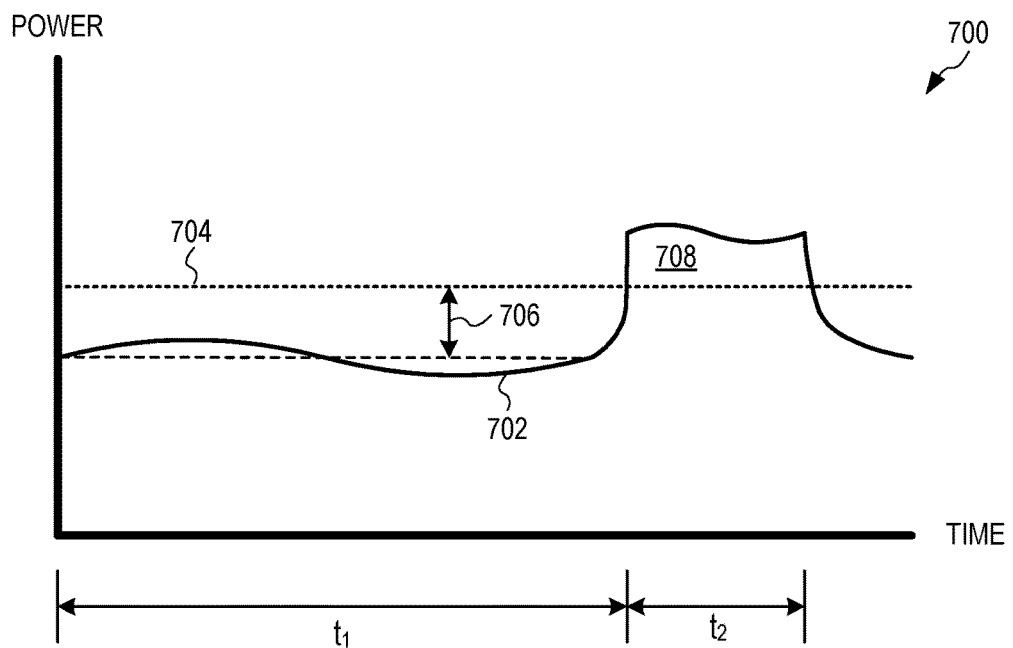
FIG. 7 is a graph of power versus time in one possible application of the FIG. 1 system, according to an embodiment.

Additionally, the large energy storage capacity of kinetic generators 108 and their ability to deliver energy to electric power bus 102 at a high rate may enable combustion generators 104 to operate with minimal spinning reserve. For example, FIG. 7 is a graph 700 of power versus time in one possible application of system 100. Curve 702 represents magnitude of load 112, and curve 704 represents output of combustion generators 104. During time period $t_1$, magnitude of load 112 is less than output of combustion generators 104, and combustion generators 104 are operating with a relatively small average spinning reserve 706. During time period $t_2$, in contrast, magnitude of load 112 is greater than output of combustion generators 104, and combustion generators 104 therefore cannot fully support load 112 during time period $t_2$. However, kinetic generators 108 provide energy 708 to load 112 during time period $t_2$, and load 112 is therefore satisfied even though combustion generators 104 cannot fully support the load. Such ability of kinetic generators 108 to support load 112 during time period $t_2$ enables combustion generators 104 to operate with small spinning reserve, thereby enabling combustion generators 104 to operate at significant capacity, or even at near full capacity. Operating combustion generators 104 at near full capacity promotes high efficiency because combustion generators generally operate most efficiently when near full capacity. If kinetic generators 108 were not present, spinning reserve 706 would need to be larger to fully support load 112 during time period $t_2$. Accordingly, in a particular embodiment, combustion generators 104 are nominally operated at at least 55%, 60%, or even 80% of nominal capacity, to promote efficient operation. Furthermore, in some embodiments, combustion generators 104 are operated close to an optimum point of a specific fuel oil consumption (SFOC) curve of the combustion generators, such as within 10% or 15% of the optimum point, to promote efficient combustion generator 104 operation.

Furthermore, the large energy storage capacity of kinetic generators 108 and their ability to deliver energy to electric power bus 102 at a high rate may enable combustion generators 104 to operate with relatively constant load, thereby promoting efficient combustion generator 104 operation and minimal starting and stopping of combustion generators 104. To help appreciate these advantages, first consider FIG. 8 which is a graph 800 of power versus time of one possible application of a system like system 100 of FIG. 1, but with kinetic generators 108 omitted. Curve 802 represents magnitude of load 112 as presented to combustion generators 104, curve 804 represents output of one combustion generator 104 instance, and curve 806 represents collective output of two combustion generator 104 instances. As can be observed from graph 800, magnitude of load 112 fluctuates between a level that can be supported by a single operating combustion generator 104 instance and a level that requires two operating combustion generator 104 instances for support. Consequently, the second combustion generator instance 104 will periodically start and stop to track magnitude of load 112, thereby resulting in inefficient operation of the second combustion generator 104 instance, as well as significant wear and tear on the second combustion generator 104 instance.

Figure 8:
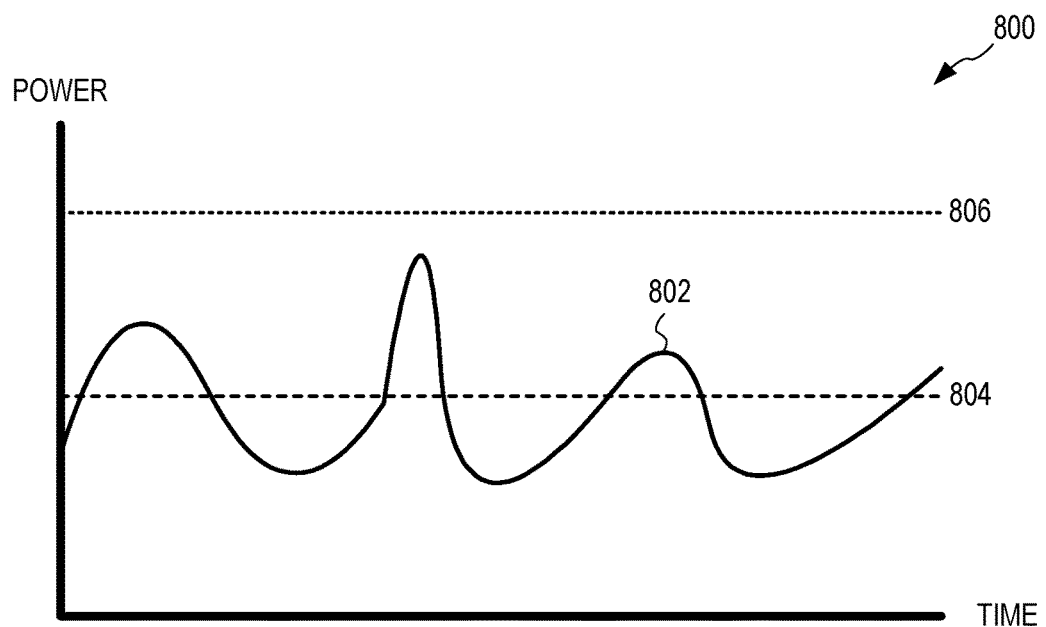
FIG. 8 which is a graph of power versus time of a microgrid electric power generation system without kinetic generators.
Figure 9:
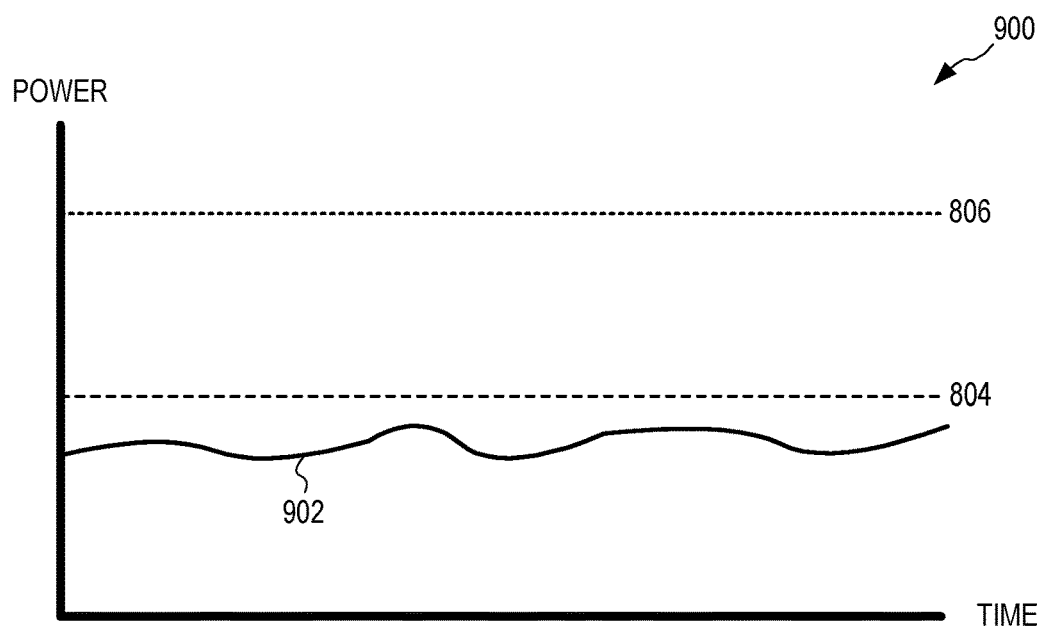
FIG. 9 is a graph of power versus time in another possible application of the FIG. 1 system, according to an embodiment.

Now consider FIG. 9, which is a graph 900 like that of FIG. 8, but with kinetic generators 108 present such that curve 902 represents magnitude of load 112 presented to combustion generators 104 after kinetic generators 108 support transient portions of load 112. As evident from FIG. 9, kinetic generators 108 largely handle the transient portion of load 112 in this particular example, such that combustion generators 104 are presented with a relatively constant load that can be handled by a single operating combustion generator 104 instance, thereby eliminating the need for starting and stopping of a second combustion generator 104 instance.

Figure 10:
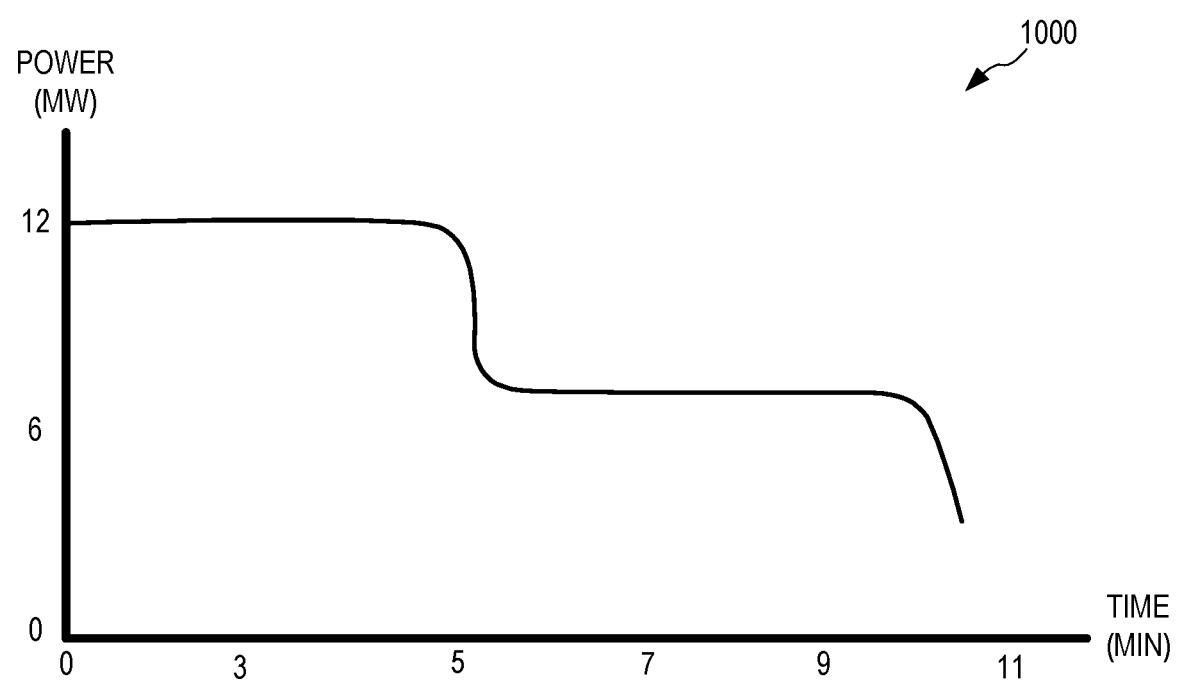
FIG. 10 is a graph of power versus time illustrating power requirements of one exemplary emergency shutdown scenario of a drilling rig.

Moreover, the large energy storage capacity of kinetic generators 108 and their ability to deliver energy to electric power bus 102 at a high rate may enable system 100 to supply backup power, such as to power critical loads and/or to provide power to facilitate quick restart of the combustion generators 104, in case of failure or shutdown of combustion generators 104. Thus, kinetic generators 108 may reduce or eliminate the need for a battery storage subsystem to provide backup power. Additionally, the large energy storage capacity of kinetic generators 108 and their ability to deliver energy to electric power bus 102 at a high rate may enable system 100 to provide power for an emergency shutdown (ESD) in a drilling rig application of system 100. ESD in a drilling rig includes shutdown of all combustion generators, e.g., combustion generators 104, continuing operation to bring the rig to safe position, and removing the rig from a well. FIG. 10 is a graph 1000 of power versus time illustrating power requirements of one exemplary ESD scenario. During approximately the first five minutes of the ESD procedure, the load is approximately 12 MW and largely results from drill floor and thrusting operation. Load during approximately the next five minutes of the ESD procedure is a little over 6 MW and primarily results from thrusting operation. Kinetic generators 108 can support the load of FIG. 10 in certain embodiments of system 100, thereby facilitating ESD in drilling rig applications of system 100.

As one possible operating scenario of system 100, assume that two instances of combustion generators 104 are operating at eighty percent of their maximum capacity and the remaining instances of combustion generators 104 are not operating. Now assume that magnitude of load 112 suddenly increases by thirty percent. Combustion power sources 124 cannot quickly respond to this load increase due to their large time constants, and combustion generators 104 therefore continue to operate at eighty percent of their maximum power output during the load change and immediately after the load change. Kinetic energy subsystems 134, however, can respond to the load increase very quickly, i.e., within less than ten milliseconds or within less one millisecond, as discussed above. Consequently, kinetic energy subsystems 134 increase their power delivery to electric power bus 102 to compensate for the thirty percent load increase within ten milliseconds, thereby minimize change in voltage $V_{bus}$ from the load change. At least 100 milliseconds after the load increase, or in some embodiments at least one second after the load increase, combustion power sources 124 increase their power output by thirty percent to compensate for the load increase, thereby relieving kinetic energy subsystems 134 from supplying the increased load.

Figure 11:
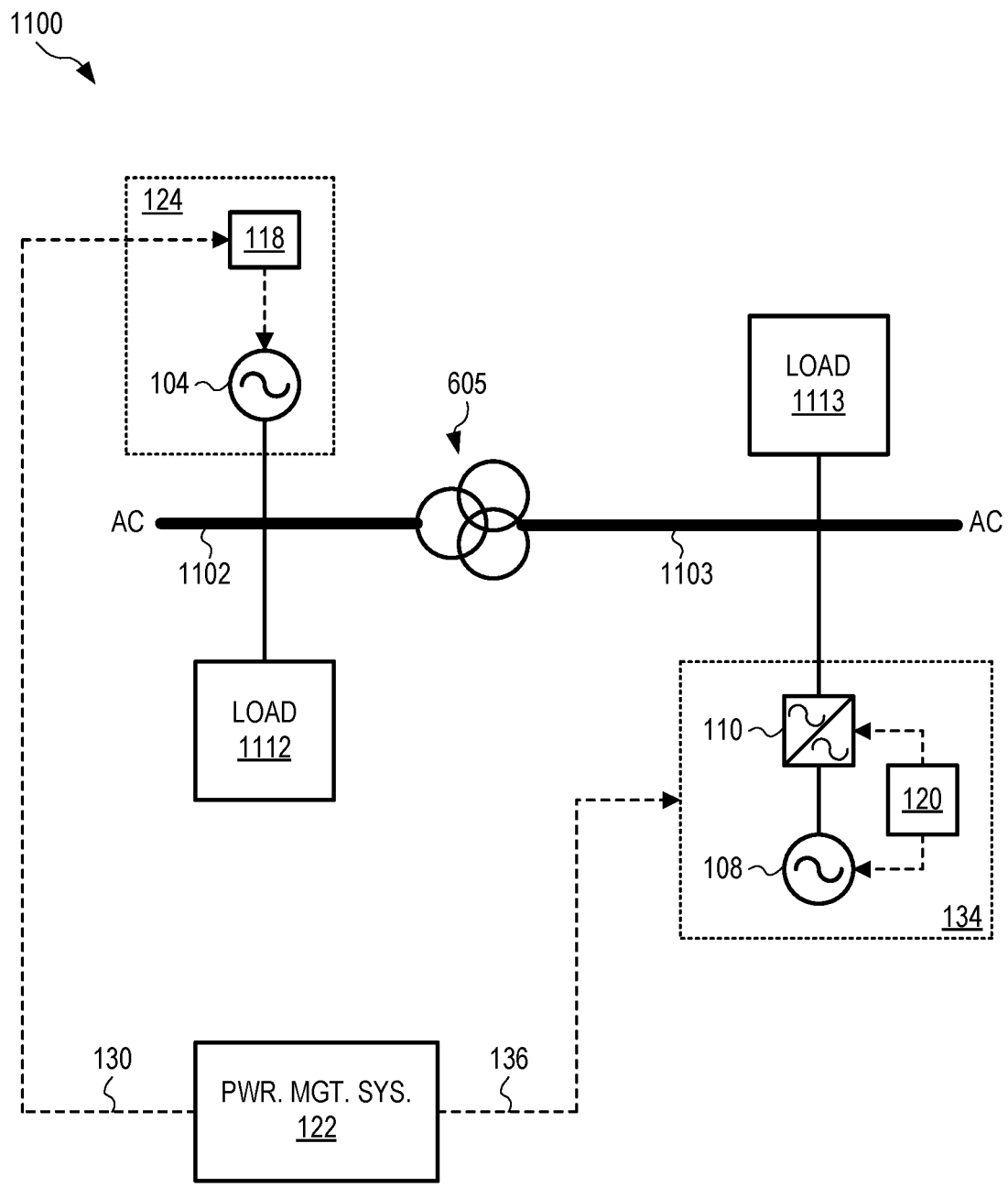
FIG. 11 illustrates one microgrid electric power generation system including two alternating current (AC) electric power buses, according to an embodiment.

The microgrid electric power generation systems of the present Application are not limited to the electrical topology of system 100 of FIG. 1. For example, FIG. 11 illustrates a microgrid electric power generation system 1100 including an AC first electric power bus 1102 electrically coupled to an AC second electric power bus 1103 by a three-phase transformer 1105. One or more combustion generators 104 are electrically coupled to first electric power bus 1102, and one or more kinetic generators 108 are electrically coupled to second electric power bus 1103 via respective AC-to-AC converters 110. A first load 1112 represents electric load of one or more elements powered by first electric power bus 1102, and a second load 1113 represents electric load of one or more elements powered by second electric power bus 1103. In a particular embodiment for use in an offshore drilling rig, first load 1112 includes, in part, electric load of multiple drilling motors and second load 1113 includes, in part, electric load of multiple thruster motors. System 1100 operates in a manner similar to that discussed above with respect to system 100 of FIG. 1.

System 1100 could have additional instances of combustion generators 104 and/or kinetic generators 108 without departing from the scope hereof. For example, one alternate embodiment of system 1100 further includes a kinetic generator 108 electrically coupled to first electric power bus 1102, as well as a kinetic generator 108 electrically coupled to second electric power bus 1103. Furthermore, system 1100 could be modified to include additional AC electric power buses, as well as one or more DC electric power buses, without departing from the scope hereof.

Figure 12:
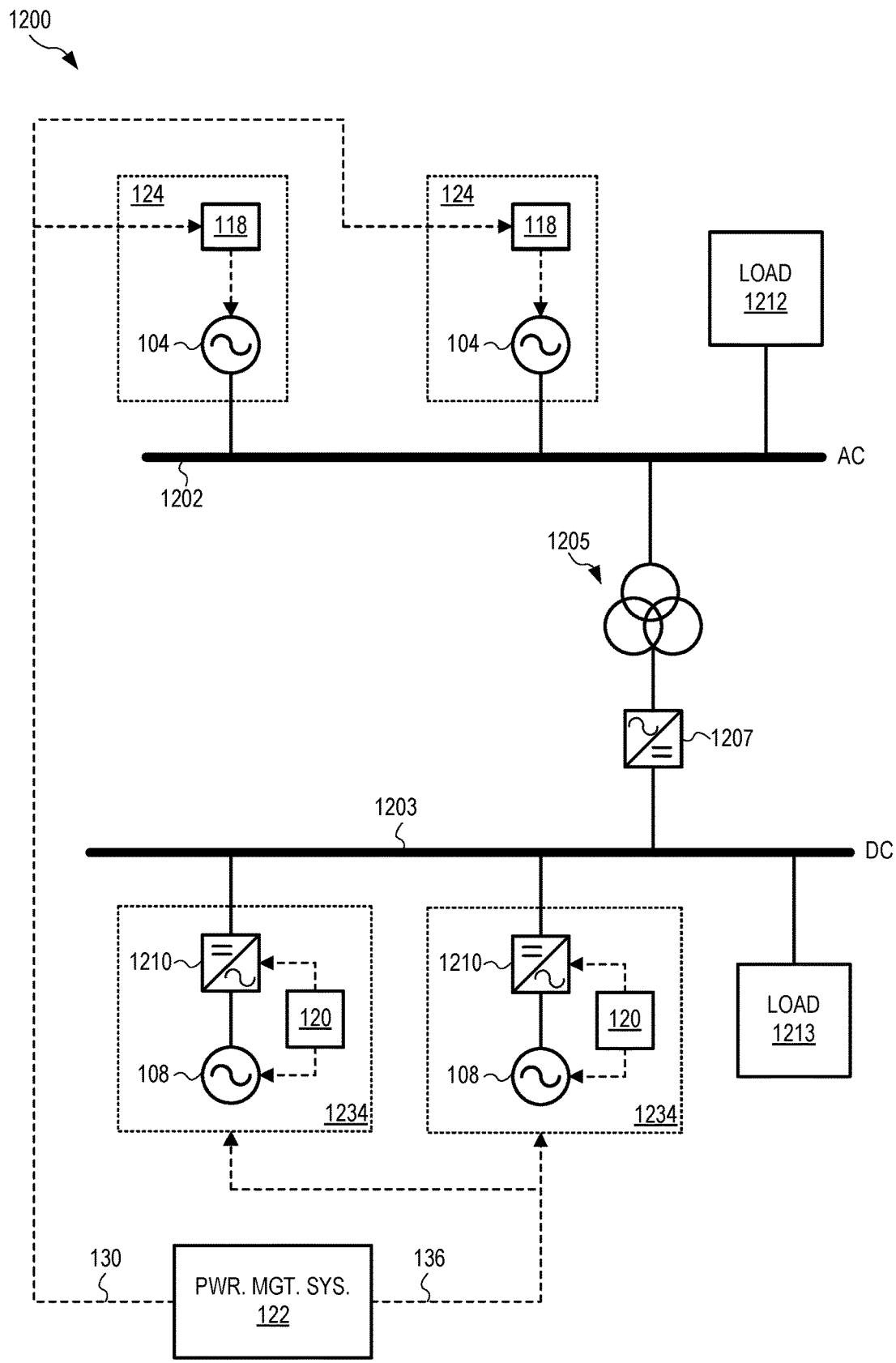
FIG. 12 illustrates one microgrid electric power generation system including an AC electric power bus and a direct current (DC) electric power bus, according to an embodiment.

FIG. 12 illustrates another possible topology of a microgrid electric power generation system including kinetic generators. In particular, FIG. 12 illustrates a microgrid electric power generation system 1200 including an AC electric power bus 1202 electrically coupled to a DC electric power bus 1203 by a three-phase transformer 1205 and an AC-to-DC converter 1207. One or more combustion generators 104 are electrically coupled to AC electric power bus 1202, and one or more kinetic generators 108 are electrically coupled to DC electric power bus 1203 via respective DC-to-AC converters 1210. Although not required, it is anticipated that a first load 1212 is powered by the AC electric power bus 1202 and that a second load 1213 is powered by DC electric power bus 1203. While each of first load 1212 and second load 1213 is symbolically shown as a single element in FIG. 12 for illustrative clarity, is anticipated that each of first load 1212 and second load 1213 will typically include an electric load of a number of elements. In certain embodiments, nominal voltage of DC electric power bus 1203 ranges from 720 volts to 1 kilovolt DC, and nominal voltage on AC electric bus 1202 ranges from 6.6 to 11 kilovolts AC. However, nominal magnitude of voltage on AC electric power bus 1202 and nominal magnitude of voltage on DC electric power bus 1203 may vary without departing from scope hereof.

DC-to-AC converters 1210 operate in a manner similar to AC-to-AC converters 110 of FIG. 1, but DC-to-AC converters 1210 instead electrically couple a respective kinetic generator 108 to a DC electric power bus, instead of to an AC electric power bus. In particular, in acceleration mode of kinetic generators 108, each second control subsystem 120 controls the DC-to-AC converter 1210 of its respective kinetic generator 108 and the motor/generator within the kinetic generator such that energy from DC electric power bus 1203 is stored as kinetic energy in the kinetic generator. In generator mode of kinetic generators 108, each second control subsystem 120 controls the DC-to-AC converter 1210 of its respective kinetic generator 108 and the motor/generator within the kinetic generator such that energy from the kinetic generator is delivered to DC electric power bus 1203. Each second control subsystem 120 also controls its respective DC-to-AC converter 1210 in generator mode of kinetic generators 108 such that output voltage of the DC-to-AC converter at DC electric power bus 1203 is within a predetermined voltage range, thereby regulating voltage $V_{bus\_dc}$ on DC electric power bus 1203.

Each kinetic generator 108, its respective DC-to-AC converter 1210, and its respective second control subsystem 120 may be collectively referred to as a kinetic energy subsystem 1234. Similar to kinetic energy subsystem 134 of FIG. 1, each kinetic energy subsystem 1234 has a small time constant, i.e., time required for the kinetic energy subsystem 1234 to change its power storage or delivery by 10%. For example, in a particular embodiment, each kinetic energy subsystem 1234 has time constant of 10 milliseconds or less, such that the kinetic energy subsystem 1234 is capable of changing its energy storage or delivery rate by 10% within 10 milliseconds of a change in magnitude of load 112. Accordingly, system 1200 of FIG. 12 operates in a manner similar to that of system 100 of FIG. 1.

System 1200 could have additional instances of combustion generators 104 and/or kinetic generators 108 without departing from the scope hereof. For example, one or more kinetic generators 108 could be electrically coupled to AC electric power bus 1202 to enable one or more kinetic generators 108 to support loads 1212 in embodiments where AC-to-DC converter 1207 is incapable of transferring power from DC electric power bus 1203 to AC electric power bus 1202. Furthermore, system 1200 could be modified to include additional AC and/or DC electric power buses without departing from the scope hereof.

In some embodiments of system 1200, AC-to-DC converter 1207 has bidirectional power transfer capability. In these embodiments, system 1200 is optionally configured such that kinetic generators 108 may be used to power AC electric power bus 1202 in case of failure or shutdown of combustion generators 104 through a "reverse" energy travel path through AC-to-DC converter 1207 and three-phase transformer 1205. In some other embodiments, AC-to-DC converter 1207 is a unidirectional power converter, i.e., it can transfer power solely from AC electric bus 1202 to DC electric bus 1203. In these embodiments, three-phase transformer 1205 optionally has an auxiliary winding, in addition to primary and secondary windings, and system 1200 further includes a DC-to-AC converter (not shown) capable of transferring power from DC electric bus 1203 to AC electric bus 1202 via the DC-to-AC converter and the auxiliary winding.

Figure 13:
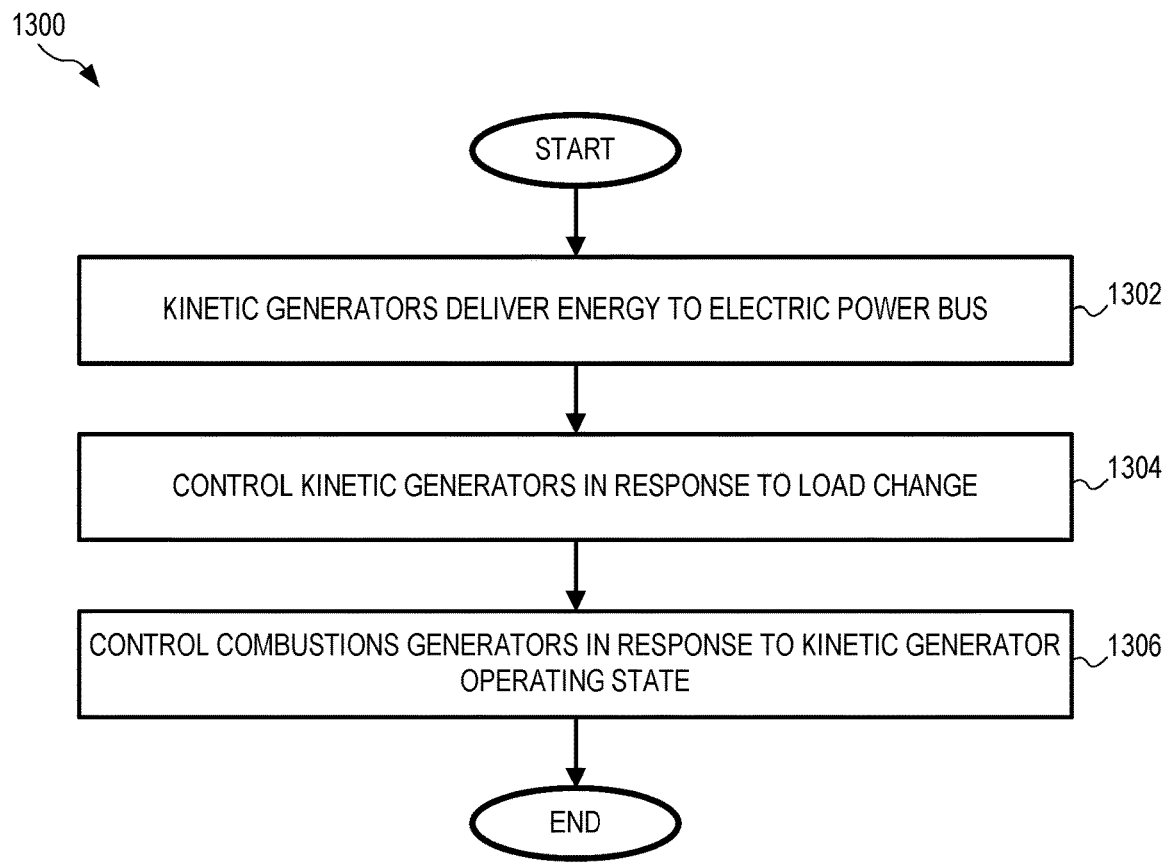
FIG. 13 illustrates a method for operating a microgrid electric power generation system, according to an embodiment.

FIG. 13 illustrates a method 1300 for operating a microgrid electric power generation system. In step 1302, energy is delivered to an electric power bus from one or more kinetic generators electrically coupled to the electric power bus. In one example of step 1302, kinetic generators 108 deliver energy to electric power bus 102 (FIG. 1), and in another example of step 1302, kinetic generators 108 deliver energy to DC electric power bus 1203 (FIG. 12). In step 1304, the one or more kinetic generators are controlled in response to a change in a load electrically coupled to the electric power bus such that a magnitude of a voltage on the electric power bus remains within a predetermined voltage range. In some embodiments, the predetermined voltage range is +/− 99%, 95%, or 90% of a nominal magnitude of the voltage on the electric power bus. Additionally, in certain embodiments, step 1304 is performed only if the change in load meets a predetermined criteria, such as the change in load having at least a minimum magnitude, transition time, and/or duration. For example, in a particular embodiment, step 1304 is performed only if the load change meets the following criteria: (a) the load change magnitude is at least 1%, 5%, or 10% of the magnitude of the load before the change, (b) the load transition is less than 100 milliseconds or less than 500 milliseconds, and/or (c) the load change duration is at least 500 microseconds or at least 1 second. In one example of step 1304, second control subsystems 120 control kinetic generators 108 such that voltage $V_{bus}$ on electric power bus 102 remains within a predetermined range in response to a change in magnitude of load 112 (FIG. 1). In another example of step 1304, second control subsystems 120 control kinetic generators 108 such that voltage $V_{bus\_dc}$ on DC electric power bus 1203 remains within a predetermined range in response to a change in magnitude of load 1213 (FIG. 12).

In step 1306, one or more combustion generators electrically coupled to the electric power bus are controlled based at least in part on an operating state of the one or more kinetic generators. In one example of step 1306, first control subsystems 118 control combustion generators 104 based at least in part on an operating state of kinetic generators 108 (FIGS. 1 and 12).

Figure 14:
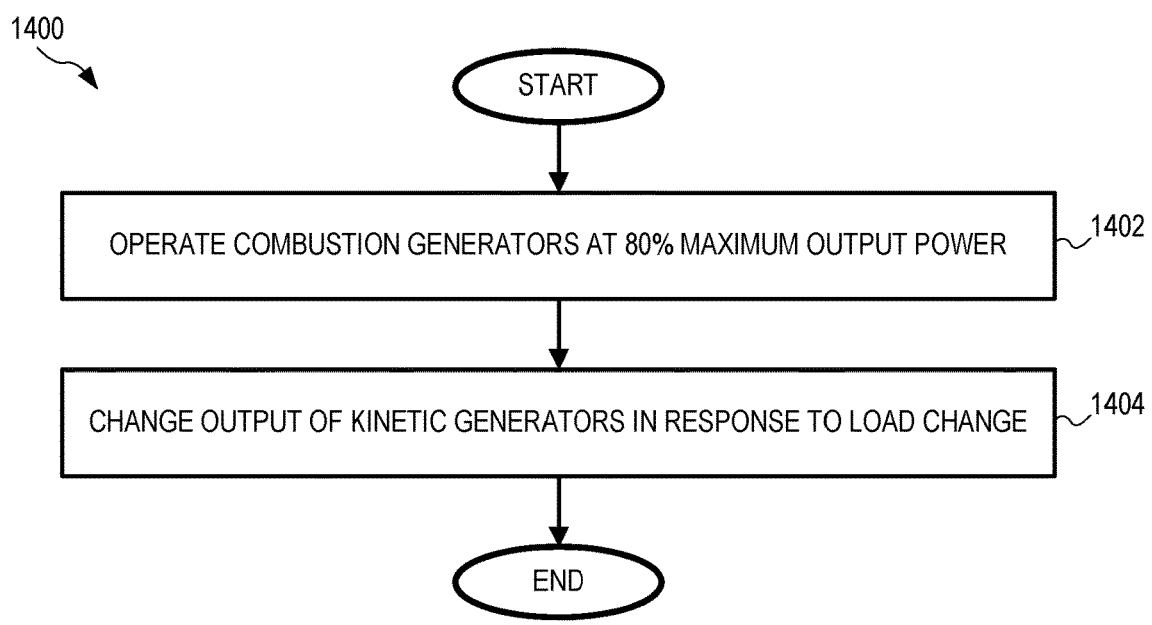
FIG. 14 illustrates another method for operating a microgrid electric power generation system, according to an embodiment.

FIG. 14 illustrates a method 1400 for operating a microgrid electric power generation system. In step 1402, one or more combustion generators electrically coupled to an electric power bus are operated at eighty percent or more of their maximum rated output power. In one example of step 1402, combustion generators 104 are operated at eighty percent of more of their maximum power output (FIGS. 1 and 12). In step 1404, an output power of one or more electric kinetic generators electrically coupled to the electric power bus is changed within ten milliseconds in response to a change in a load electrically coupled to the electric power bus. In one example of step 1404, output power of kinetic generators 108 is changed within ten milliseconds in response to a change in magnitude of load 112 (FIG. 1), and in another example of step 1404, output power of kinetic generators 108 is changed within ten milliseconds in response to a change in magnitude of load 1212 or 1213 (FIG. 12).

The previously discussed peak power demands of a drilling rig exist during certain activities or operations on the drilling rig. These activities or operations includes a so-called "tripping" of the pipe or drill stem in/out of the well, running and retrieving the riser, lifting operations on the drill floor, lifting operations with cranes or other hoisting equipment etc. Base load demand will vary based on the particular well, depth of drilling, and material being drilled and equipment used for drilling operations. During oil/gas well drilling activities, the most intermittent load is often the lifting device for the drill floor (i.e. the lifting device for lifting tubulars in and out of the well center and to/into the seabed also referred to as the hoisting system) such as drawworks, winch, and HPU for lifting cylinders. This intermittent load causes a peak power demand during the raising or lowering of the drill pipe upwardly and downwardly in the well. This peak power demand can be incurred by loads 2-3 times (or more) larger than the base loads of the other demands on the drilling rig. For example, during a drilling operation it may be necessary to retrieve the drill string after finishing a section of the well or to replace the drill bit. This drill string can be 10,000 feet or more. During the tripping in, and particularly when tripping out, of the hole, the driller (operator) demands extreme power consumption in power bursts as the driller raises (or lowers) the string of drill pipe. Since there is a limitation on the height of the drilling mast, the operator must lift the string out in sections (typically in stands of 2 to 4 drill pipes) by lifting a section over the drill floor, stop lifting, break out a stand and rack it back and commence lifting again. This process is reversed during the reinsertion of the drill pipe back into the hole. This process is often referred to as "tripping" in or out of the hole. In some embodiments, the intermittent peak power demand for example occurs when this load (e.g. 300,000 pounds or more) is applied to the electric motor or motors lifting the pipe string over and over again. The load is variable since the weight of the drill stem becomes less and less as pipe sections are removed. The base load requirements for a drilling rig are approximately 1-5 MW or even higher. The peak demand can be more than 3-9 MW or more larger than the base load. Another example of intermittent loads occur when multiple machines are caused to begin operating simultaneously. Such events may be more likely in drilling rigs with advanced automation systems so that a single actuation by the operator can coordinate several machines to begin working towards a particular operation.

To deliver such power bursts without overloading the active engines/generators or requiring an excessive number of simultaneously active engines/generators it is advantageous to deliver power or energy for these power bursts by an energy storage via a DC bus or a DC bus subsection of the energy generation. This delivery of power from an energy storage to handle temporary increases in load is often referred to as "peak-shaving." Kinetic generators 108 of certain embodiments of the featured microgrid electric power generation systems are used, for example, to deliver energy for such peak-shaving.

The featured microgrid electric power generation systems are typically suitable for peak shaving because kinetic generators 108 will typically be able to react much faster, i.e. possess a smaller time constant than an AC generator, such as combustion generators 104, in response to peaks or bursts in the power consumption of the AC bus load or loads. In some embodiments, kinetic generators 108 have a response time 50% or less than that of that of the combustion generators 104, such as 25% or less, such as 10% or less, such as 5% or less such as 1% or less. In one embodiment the response time is measured as the time to increase the power output with 1 MW. Typically, kinetic generator 108's power delivery will be limited by power electronics and thus multiple kinetic generators may be required to deliver high peaks (e.g. 6 MW for 1 or 2 seconds). Some of multiple kinetic generators 108 may be connected directly to separate sections of a DC electric power bus.

The energy storage capacity of kinetic generators 108 may be sufficiently large, such as 360 MJ or more, such as 500 MJ or more, such as 1200 MJ or more to power large loads on an AC electric power bus for a certain period of time. In one embodiment, kinetic generators 108 are configured to power a 5 MW thruster of the drilling rig for at least 5 minutes during a failure of a combustion generator that would have left the AC electric power bus powerless. Another embodiment of kinetic generator 108 is configured to power a 6.5 MW thruster for at least 5 minutes with a 50% load. Additionally, some embodiments of kinetic generators 108 may be capable of providing sufficient energy to drive first and second thrusters, e.g. each representing a load of 4-6 MW, to 50% of their respective maximum power for at least 5 minutes. In some embodiments, kinetic generator 108, including the associated power electronics connecting the kinetic generator to an electric power bus, may be capable of providing peak power delivery larger than 2.0 MW. A single kinetic generator 108 or multiple kinetic generators may be connected to the same section of the DC electric power bus.

The skilled person will understand that the microgrid electric power generation systems disclosed herein may include a plurality of individual kinetic generators 108, for example more than 2, 4, or 15 individual kinetic generators. An exemplary embodiment of the microgrid electric power generation system includes 18 individual kinetic generators each possessing an energy storage capacity of 360 MJ to provide a total energy storage capacity of at least 6480 MJ for the system. The 18 individual kinetic generators may possess a combined peak power supply capability of 6 MW or even larger.

In some embodiments, one or more of first control subsystems 118, second control subsystems 120, and power management subsystem 122 may represent detected AC voltage on an AC electric power bus in a variety of formats such as RMS voltage, peak voltage, instantaneous voltage, average voltage etc. Some parameters of the AC bus may relate to a duration of a certain AC voltage value or other waveform shape or waveform characteristics of the AC voltage on the AC bus. Other parameters of the AC bus may relate to an AC current or AC power flowing through the AC bus. The one or more parameters of the AC bus may characterize the electrical integrity of the AC bus.

In certain embodiments, one or more DC electric power bus loads may include at least one of: a lifting device for the drill floor, a mud pump motor, a cement pump motor, a rotary table motor. The lifting device may include a hoisting system for example a hoisting system with a lifting capacity larger than 500 tons or larger than 800 tons or larger than 1000 tons or larger than 1200 tons such as larger than 1500 tons.

Some embodiments of the featured microgrid electric power generation systems may possess a multi-segmented topology including a plurality of connectable AC electric power bus subsections and a plurality of connectable DC electric power bus subsections. Hence, the AC electric power bus may include a plurality of AC electric power bus subsections wherein each AC electric power bus subsection includes first and second bus tie breakers for selectively connecting and disconnecting the AC electric power bus subsection to the AC bus; and the DC bus may include a plurality of DC electric power bus subsections wherein each DC electric power bus subsection includes first and second bus tie breakers for selectively connecting and disconnecting the DC electric power bus subsection to the DC electric power bus. In some embodiments, the plurality of AC electric power bus subsections are electrically connected to the AC electric power bus in a ring configuration; and/or the plurality of DC electric power bus subsections are electrically connected to the DC electric power bus in a ring configuration. One or several AC combustion generator(s) may be directly connected to each of the plurality of connectable AC electric power bus subsections. One or several kinetic generators 108 may be directly connected to each of the plurality of connectable DC electric power bus subsections. Each AC electric power bus subsection may be energized by the one or more kinetic generators 108 even under system operating conditions where the AC combustion generator of the AC electric power bus subsection in question fails and the AC electric power bus section is isolated by the first and second bus tie breakers.

Certain embodiments of the featured systems and methods of the present disclosure may be used in, for example, various types of drilling rigs such as drillship, semi-submersible rig, jack-up rig, barge or landrig, etc. However, the present systems and methods are not limited to drilling rig applications. For example, the featured microgrid electric power generation systems could be used in other marine vessels, such as commercial and military ships. The disclosed microgrid electric power generation systems may be particularly beneficial in shipping applications requiring minimal noise, heat, and pollution emissions because kinetic generators 108 are capable of providing electric power with significantly less heat and noise compared to combustion generators. Additionally, kinetic generators 108 emit essentially no pollution during operation, in contrast to combustion generators which typically emit significant pollution during operation. Thus, the featured microgrid electric power generation systems may be particular useful in shipping applications where ships spend significant time in harbor and in stealth military shipping applications. Other possible applications of the featured microgrid electric power generation systems include uninterruptable power supply applications, subsea microgrid electric power generation systems, land-based microgrid electric power generation systems, and applications which require fast charging, such as a hybrid ferry applications.

Changes may be made in the above systems and methods without departing from the scope hereof. For example, the electrical topologies of the featured systems and methods may be varied without departing from scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

Additional Embodiments (A1) A microgrid power generation system may include an AC or DC power bus or plane and a first controllable ac combustion generator electrically connected to the AC or DC power bus for supply of electrical power thereto. The first controllable ac combustion generator includes a first data bus interface for receipt of first set-point data defining power generation of the first controllable ac combustion generator. The microgrid power generation system further includes one or more bus loads, such as a thruster drive, electrically connected to the AC or DC power bus. In addition, the microgrid power generation system includes a flywheel energy storage device electrically connected the AC or DC power bus, wherein said flywheel energy storage device includes a second data bus interface for receipt of state control data for selectively causing the flywheel energy storage device to supply and absorb/store electrical power from the AC or DC power bus. Furthermore, the microgrid power generation system includes a microgrid controller connected to the first controllable ac combustion generator and the flywheel energy storage device through the first and second data bus interfaces, respectively, via a common data bus or several separate data busses. The microgrid controller further includes (a) a primary control loop arranged to maintaining a predetermined voltage and/or frequency on the AC or DC power bus by adaptively adjusting power delivery and power absorption of the flywheel energy storage, and (b) a secondary control loop arranged to adaptively adjusting supply of electrical power to the AC or DC power bus by increasing or decreasing power generation of the first controllable ac combustion generator in accordance with at least one control variable.

(A2) In the microgrid power generation system denoted as (A1), the secondary control loop may be configured to adjust a first set-point of the first controllable ac combustion generator to increase or decrease its power generation, and/or the secondary control loop may be configured to deactivate and activate the first controllable ac combustion generator to increase or decrease its power generation.

(A3) In either one of the microgrid power generation systems denoted as (A1) and (A2), the least one control variable of the secondary control loop may include one or more of (a) a current amount of energy stored in the flywheel energy storage device, (b) an energy or power discharge rate of the flywheel energy storage device, and (c) a current or average power consumption of the one or more bus loads.

(A4) In any one of the microgrid power generation systems denoted as (A1) through (A3), the primary control loop may include one or more primary control variables derived from a voltage and/or frequency on the AC power bus or a voltage on DC power bus.

(A5) In any one of the microgrid power generation systems denoted as (A1) through (A4), a time constant of the primary control loop may be smaller than 20 ms, preferably smaller than 10 ms, and/or a time constant of the secondary control loop may be larger than 100 ms, preferably smaller than 1 s.

(A6) In any one of the microgrid power generation systems denoted as (A1) through (A5), a peak load on the AC or DC power bus drawn by the one or more bus loads may be at least two times or three times larger than a maximum power generation capacity of the first controllable ac combustion generator.

(A7) In any one of the microgrid power generation systems denoted as (A1) through (A6), the microgrid controller may be configured to, (i) during an initialization phase/power-on phase of the microgrid, adjust the first set-point of the first controllable ac combustion generator to supply a total electrical power on the AC or DC power bus exceeding the electrical power drawn or consumed by the one or more bus loads by a surplus power amount, and (ii) controlling, via the common data bus, the flywheel energy storage device to absorbing and storing the surplus power amount from the AC or DC power bus.

(A8) In the microgrid power generation system denoted as (A7), the microgrid controller may be configured to (1) monitoring the charging or energizing of the flywheel energy storage device caused by the storage of surplus power from the AC or DC power bus during the initialization phase/power-on phase, and (2) interrupting the storage of power in the flywheel energy storage device via the data bus when the energy reaches a predetermined charging criterion or limit.

(A9) In any one of the microgrid power generation systems denoted as (A1) through (A8), the microgrid controller may be configured to (I) repeatedly determining the current amount of energy stored in the flywheel energy storage device via the third data interface, (II) comparing the current amount of energy of the flywheel energy storage device with a predetermined energy limit, (III) if the current amount of energy falls below the predetermined energy limit: increasing the first set-point of the first controllable ac combustion generator, or activating the first controllable ac combustion generator, to increase the amount of power supplied to the AC or DC power bus, and (IV) controlling, via the common data bus, the flywheel energy storage device to retrieve and store energy from the AC or DC power bus.

(A10) Any one of the microgrid power generation systems denoted as (A1) through (A9) may further include one or more additional controllable ac combustion generator(s) each electrically connected the AC or DC power bus for supply of electrical power thereto, wherein each of the one or more additional controllable ac combustion generator(s) includes a data bus interface for receipt of respective set-point data from the microgrid controller via the common data bus, and wherein the respective set-point data are defining power generation of the one or more additional controllable ac combustion generators.

(A12) Any one the microgrid power generation systems denoted as (A1) through (A10) may further include one or more additional flywheel energy storage device(s) electrically connected the AC or DC power bus, wherein each additional flywheel energy storage device includes a data bus interface for receipt of state control data for selectively causing the flywheel energy storage device to supply and absorb/store electrical power from the AC or DC power bus.

What is claimed is:

1. A method for operating a microgrid electric power generation system, comprising:
   delivering energy to a first electric power bus at least partially from one or more kinetic generators electrically coupled to the first electric power bus, the one or more kinetic generators storing energy therein in kinetic form;
   controlling the one or more kinetic generators in response to a change in a load powered by the first electric power bus such that a magnitude of a voltage on the first electric power bus remains within a predetermined voltage range, while maintaining an output power of one or more combustion generators electrically coupled to the first electric power bus at a constant value during the change in load; and
   controlling the one or more combustion generators based at least in part on an operating state of the one or more kinetic generators.

2. The method of claim 1, further comprising controlling the one or more combustion generators independent of the voltage on the first electric power bus.

3. The method of claim 1, wherein a magnitude of the change in load is at least ten percent of a magnitude of the load before the change in load.

4. The method of claim 3, wherein a duration of the change in load is at least one second.

5. The method of claim 1, wherein the one of more kinetic generators are electrically coupled to the first electric power bus via at least one of a power converter and a transformer.

6. The method of claim 5, wherein the one of more kinetic generators are electrically coupled to the first electric power bus via a second electric power bus.

7. The method of claim 1, further comprising maintaining the output power of the one or more combustion generators at eighty percent or more of a maximum rated output power of the one or more combustion generators during the change in load.

8. The method of claim 1, further comprising controlling the one or more combustion generators in response to a signal indicating an upcoming change in the load.

9. The method of claim 1, wherein controlling the one or more combustion generators based at least in part on the operating state of the one or more kinetic generators comprises controlling the one or more combustion generators according to one or more of (a) kinetic energy storage level of the one or more kinetic generators and (b) kinetic energy loss rate of the one or more kinetic generators.

10. The method of claim 1, further comprising:
controlling the one or more kinetic generators in response to the change in the load within 10 ms of the change in load; and
controlling the one or more combustion generators at least one second after the change in load.

11. The method of claim 10, the step of controlling the one or more combustion generators comprising:
initiating change in operation of the one or more combustion generators; and
changing power output of the one or more combustion generators at least one second after the step of initiating.

12. The method of claim 1, further comprising providing an output power of at least 1 MW from the one or more kinetic generators to the load for at least 5 minutes.

13. The method of claim 1, further comprising spinning a rotor of each kinetic generator at a speed of at least 30,000 revolutions per minute.

14. The method of claim 1, wherein the first electric power bus is an AC electric power bus and the method further comprises controlling the one or more kinetic generators such that frequency of the voltage on the first electric power bus remains within a predetermined frequency range.

15. A microgrid electric power generation system, comprising:
a first electric power bus;
one or more combustion power sources, each combustion power source including:
a combustion generator electrically coupled to the first electric power bus, and
a first control subsystem configured to control delivery of power by the combustion generator to the first electric power bus,
each combustion power source having a respective first time constant representing an amount of time required for the combustion power source to change its power output by ten percent; and
one or more kinetic energy subsystems, each kinetic energy subsystems including:
a kinetic generator capable of (a) delivering energy stored therein to the first electric power bus, and (b) storing energy from the first electric power bus in kinetic form,
a power converter electrically coupling the kinetic generator to the first electric power bus, and
a second control subsystem configured to control the kinetic generator and the power converter of the kinetic energy subsystem such that magnitude of a voltage on the first electric power bus remains within a predetermined voltage range,
each kinetic energy subsystem having a respective second time constant representing an amount time required for the kinetic energy subsystem to change its power storage or delivery by ten percent, each second time constant being smaller than each first time constant.

16. The microgrid electric power generation system of claim 15, wherein the first control subsystem of each combustion power source is further configured to control its respective combustion generator independent of the voltage on the first electric power bus.

17. The microgrid electric power generation system of claim 15, further comprising a transformer and a second electric power bus, each kinetic generator being electrically coupled to the first electric power bus at least via its respective power converter, the second electric power bus, and the transformer.

18. The microgrid electric power generation system of claim 15, wherein each second time constant is no more than ten percent of each first time constant.

19. The microgrid electric power generation system of claim 15, wherein each first control subsystem is further configured to control its respective combustion generator based at least in part on an operating state of the kinetic generators of the one or more kinetic energy subsystems.

20. The microgrid electric power generation system of claim 19, the operating state of the kinetic generators of the one or more kinetic energy subsystems comprising at least one of (a) kinetic energy storage level of the kinetic generators and (b) kinetic energy loss rate of the kinetic generators.

21. The microgrid electric power generation system of claim 15, each second control subsystem further configured to control its respective kinetic generator according to a load powered by the first electric power bus.

22. The microgrid electric power generation system of claim 21, each second control subsystem being further configured to control its respective kinetic generator according to a signal indicating an upcoming change in the load powered by the first electric power bus.

23. The microgrid electric power generation system of claim 15, wherein the first electric power bus is an AC electric power bus and each second control subsystem is further configured to control its respective kinetic generator such that frequency of the voltage on the first electric power bus remains within a predetermined frequency range.

24. The microgrid electric power generation system of claim 15, each kinetic generator having an energy storage capacity of at least 100 kWh and a response time of no more than 2 milliseconds.

25. The microgrid electric power generation system of claim 24, the kinetic generators of the one or more kinetic energy subsystems collectively having a maximum power output of at least 4 MW.

26. The microgrid electric power generation system of claim 15, the kinetic generators of the one or more kinetic energy subsystems collectively having a maximum power output that is at least as large as a maximum power output of any one combustion generator of the one or more combustion power sources.

27. The microgrid electric power generation system of claim 15, the first electric power bus being one or more of a direct current (DC) electric power bus and an alternating current (AC) electric power bus.

28. The microgrid electric power generation system of claim 15, each kinetic generator having horizontal extent of less than 2 meters.

29. The microgrid electric power generation system of claim 15, a rotor of each kinetic generator being capable of rotating at a speed of at least 30,000 revolutions per minute.

* * * * *